(12) United States Patent
Baun et al.

(10) Patent No.: US 11,971,016 B2
(45) Date of Patent: Apr. 30, 2024

(54) NACELLE FOR A WIND TURBINE

(71) Applicant: Vestas Wind Systems A/S, Aarhus N (DK)

(72) Inventors: Torben Ladegaard Baun, Skødstrup (DK); Jesper Lykkegaard Neubauer, Hornslet (DK); Renato Catroga, Egå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 95 days.

(21) Appl. No.: 17/772,301

(22) PCT Filed: Nov. 20, 2020

(86) PCT No.: PCT/DK2020/050316
§ 371 (c)(1),
(2) Date: Apr. 27, 2022

(87) PCT Pub. No.: WO2021/098927
PCT Pub. Date: May 27, 2021

(65) Prior Publication Data
US 2022/0403829 A1    Dec. 22, 2022

(30) Foreign Application Priority Data
Nov. 22, 2019   (DK) .............. PA 2019 70712

(51) Int. Cl.
*F03D 13/10*    (2016.01)
*F03D 80/00*    (2016.01)
(Continued)

(52) U.S. Cl.
CPC ............. *F03D 80/88* (2016.05); *F03D 13/10* (2016.05); *F03D 13/122* (2023.08);
(Continued)

(58) Field of Classification Search
CPC ........ F03D 80/80; F03D 80/88; F03D 80/881; F03D 80/821; F03D 80/82; F03D 80/003;
(Continued)

(56) References Cited

U.S. PATENT DOCUMENTS 9,514,874 B2 * 12/2016 Gaard .................. H01F 27/025
2009/0129931 A1 * 5/2009 Stiesdal .................. F03D 80/00
416/204 R (Continued)

FOREIGN PATENT DOCUMENTS

DE          10013442 C1    10/2001
EP          2412970 A1      2/2012
(Continued)

OTHER PUBLICATIONS

Danish Patent and Trademark Office, Search and Examination Report in PA 2019 70712, May 5, 2020.
(Continued)

*Primary Examiner* — Courtney D Heinle
*Assistant Examiner* — Andrew J Marien
(74) *Attorney, Agent, or Firm* — Wood Herron & Evans LLP

(57) ABSTRACT

A wind turbine nacelle configured for mounting on a wind turbine tower and for supporting a rotor-supporting assembly, the nacelle comprising a main unit, and at least one auxiliary unit. The auxiliary unit accommodates a at least one component, e.g. a converter or transformer. To provide efficient transportation, lower costs and easier assembly, the operative component is suspended directly on the main unit.

21 Claims, 14 Drawing Sheets

Figure 1A:
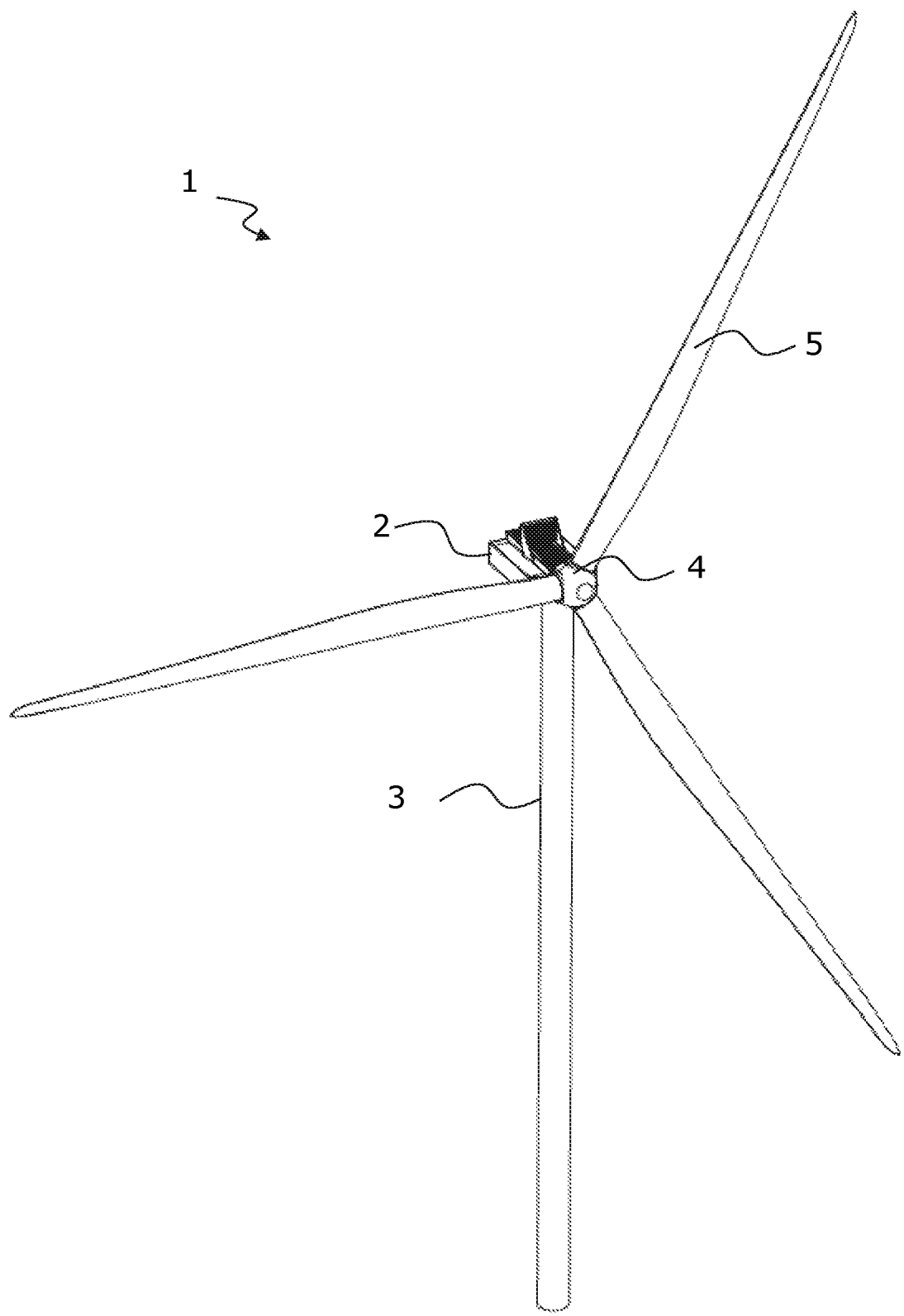

(51) Int. Cl.
  *F03D 80/50* (2016.01)
  *F03D 80/60* (2016.01)
  *F03D 80/80* (2016.01)

(52) U.S. Cl.
  CPC ........... *F03D 80/003* (2023.08); *F03D 80/50* (2016.05); *F03D 80/60* (2016.05); *F03D 80/601* (2023.08); *F03D 80/80* (2016.05); *F03D 80/82* (2016.05); *F03D 80/821* (2023.08); *F03D 80/85* (2016.05); *F03D 80/881* (2023.08); *F05B 2230/61* (2013.01); *F05B 2240/14* (2013.01); *F05B 2260/30* (2013.01)

(58) Field of Classification Search
  CPC ........ F03D 80/85; F03D 80/60; F03D 80/601; F03D 13/122; F05B 2230/61; F05B 2240/14; F05B 2260/30
  See application file for complete search history.

(56) References Cited

U.S. PATENT DOCUMENTS

| | | | | |
|---|---|---|---|---|
| 2011/0241353 | A1* | 10/2011 | Numajiri | F03D 9/25 290/1 B |
| 2011/0278852 | A1* | 11/2011 | Hjort | F03D 80/00 290/55 |
| 2012/0025541 | A1* | 2/2012 | Hirai | F03D 80/60 290/55 |
| 2012/0074711 | A1* | 3/2012 | Sato | F03D 1/0691 290/55 |
| 2012/0146335 | A1* | 6/2012 | Bywaters | F03D 80/82 290/55 |
| 2013/0011272 | A1* | 1/2013 | Mortensen | F03D 13/10 416/244 R |
| 2013/0115099 | A1* | 5/2013 | Valero Lafuente | F03D 80/50 416/244 R |
| 2021/0062791 | A1* | 3/2021 | Uphues | F03D 13/10 |

FOREIGN PATENT DOCUMENTS

| | | |
|---|---|---|
| EP | 2525090 A1 | 11/2012 |
| EP | 2550453 A2 | 1/2013 |
| EP | 3247899 A1 | 11/2017 |
| EP | 3276169 A1 | 1/2018 |
| WO | 2011117005 A2 | 9/2011 |

OTHER PUBLICATIONS

European Patent Office, International Search Report and Written Opinion in PCT Application No. PT/DK2020/050316, Jan. 26, 2021.

* cited by examiner

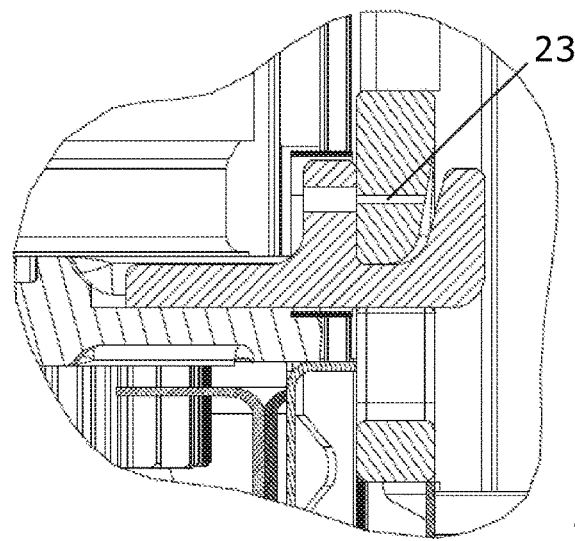
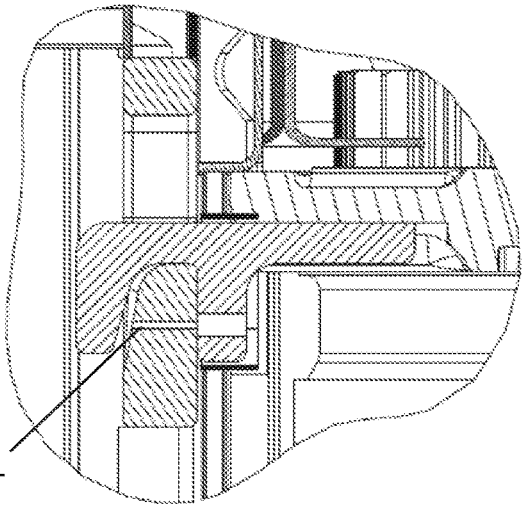
Fig. 23　　　　　　　　　Fig. 24
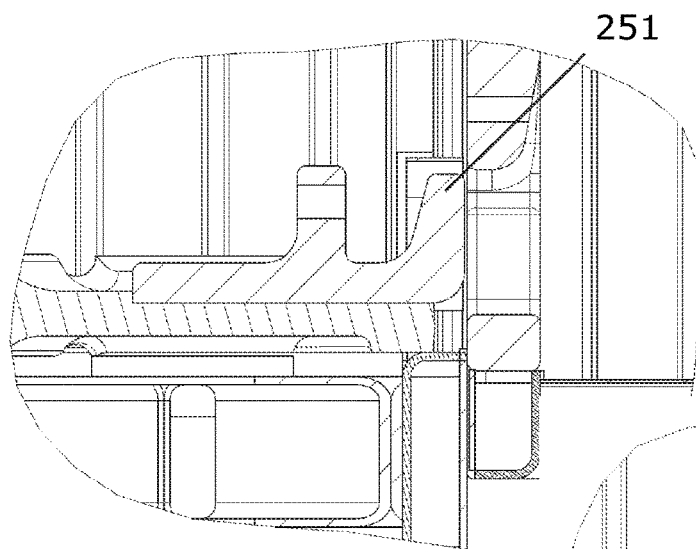
Fig. 25a
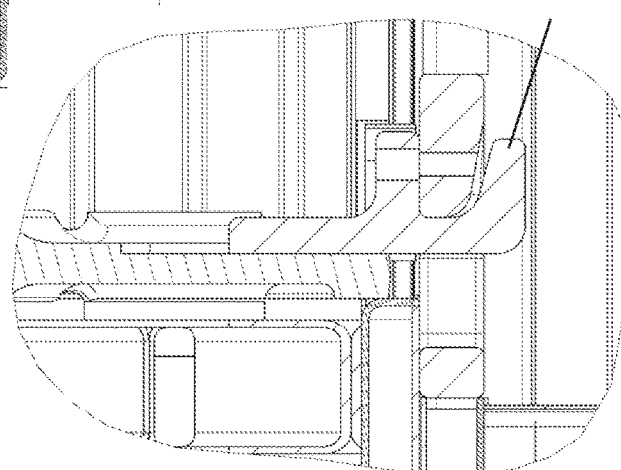
Fig. 25b

NACELLE FOR A WIND TURBINE

INTRODUCTION

The present disclosure relates to a nacelle for a wind turbine. The nacelle comprises a main unit and at least one auxiliary unit mounted on a side of the main unit. The nacelle of the present disclosure is particularly suitable for use in large wind turbines. The disclosure further relates to a method for making a wind turbine comprising such a nacelle.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported from the location or locations of manufacture of the individual parts to the operating site where the wind turbine is erected by road, rail or ship or a combination thereof.

SUMMARY

It is an object of embodiments of the disclosure to facilitate further modularity, ease of design and manufacturing and allow for improved maintenance of wind turbines. It is a further object of embodiments of the disclosure to provide a nacelle which is transportable using ordinary transport means and to lower transportation and handling costs without limiting the possible size of the nacelle.

According to these and other objects, the disclosure provides a wind turbine nacelle configured for mounting on a wind turbine tower and housing a rotor-supporting assembly. The rotor-supporting assembly supports a rotor which drives a generator. Additionally, the nacelle houses a power conversion assembly.

The nacelle comprises:
  a main unit connectable to a wind turbine tower, e.g. via
    a yawing arrangement, and housing the rotor-supporting assembly and optionally the generator, and
  at least one auxiliary unit housing an operative component
    forming part of the power conversion assembly.

The main unit and the auxiliary unit are separate units assembled in an interface by a unit fixation structure, and the operative component is suspended directly on the main unit.

Since the auxiliary unit accommodates an operative component suspended directly on the main unit, and since the main unit is connectable to the wind turbine tower, the main unit forms a load path for the operative component into the wind turbine tower.

If needed, the auxiliary unit may be released from the main unit without releasing the operative component, and the auxiliary unit may be designed for smaller loads compared to the main unit. It may e.g. be dimensioned and designed for storage and transportation of the operative component but not for carrying the full load of the operative component on the tower.

Examples of a main unit and/or an auxiliary unit include units of any size and shape and configured to be assembled.

The auxiliary and/or the main unit may be formed with size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced when the main and/or auxiliary unit is a shipping freight container. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

The main unit and the auxiliary unit may be arranged side by side in a direction away from a rotational axis defined by the rotor-supporting assembly as opposed to one after the other in the direction of the rotational axis.

In one embodiment, the nacelle comprises two auxiliary units, e.g. arranged on opposite sides of the main unit. In that embodiment, each of the two auxiliary units may have half the size of one shipping freight container following the dimensions and structural specifications in the ISO standard of ISO 668:2013 for series 1 freight containers, and arranged such that the two half parts of the container can be assembled to form one container during transport, and split into two auxiliary units to be arranged e.g. on opposite sides of the main unit. The container may particularly be split in an interface extending in the longitudinal direction of the container, i.e. the longest dimension of the container.

The nacelle may be carried either directly by the tower or indirectly by the tower via an intermediate tower structure. If the wind turbine is of the traditional horizontal axis type, the nacelle is typically carried by a yawing arrangement between the tower top and the nacelle. The disclosure may, however, also relate to a multiple rotor wind turbine of the kind where more than one nacelle are carried by a transverse beam structure which is again carried by the tower, e.g. via a yawing arrangement between the tower and the transverse beam structure.

The disclosure may relate to an upwind wind turbine or to a downwind wind turbine.

The main unit is the part connecting the nacelle to the tower, either directly or indirectly via said intermediate tower structure or structures. The main unit may particularly be the central part of the nacelle and houses parts of the drivetrain such as at least a part of the rotor shaft.

The wind turbine could be a direct drive wind turbine with the generator typically placed outside the nacelle, or the wind turbine could be with the generator located in the main unit. The main unit supports the rotor via the rotor shaft.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame forming part of the rotor-supporting assembly and forming a load path from the rotor into the tower or intermediate tower structure, e.g. via a yawing arrangement. The main frame may particularly be a casted component.

In addition to the main frame, the rotor-supporting assembly may comprise e.g. a bearing structure and other components supporting the rotor in the wind turbine.

The operative component which is housed in the auxiliary unit may particularly be suspended directly on the main frame, i.e. such that the main frame forms a load path from the operative component into the tower. Particularly, the operative component may be suspended on the main frame via a first suspension structure and may be suspended such that the auxiliary unit does not form part of the load path from the operative component into the tower.

The nacelle may be rotatable relative to the tower via a yawing arrangement. This may either be facilitated by connecting the nacelle to the tower via the yawing arrangement, or, in a multi rotor wind turbine, by connecting at least two main frames of individual nacelle structures to a tower via said intermediate tower structure which is again joined to the tower via a yawing arrangement.

The nacelle may comprise a second suspension structure configured for suspension of the operative component on the auxiliary unit.

The unit fixation structure may be configured to fixate the auxiliary unit to the main unit in an assembly position of the auxiliary unit relative to the main unit. The first suspension structure may be configured to take over suspension of the operative component from the second suspension structure upon movement of the auxiliary unit to the assembly position.

In one example, the operative component is carried, e.g. on the floor or on a wall, of the auxiliary unit by the second suspension structure, and when the auxiliary unit is lowered into the assembly position, the first suspension structure lifts the operative component out of the supporting relationship with the auxiliary unit. From that moment, the operative component is suspended on the main frame via the second suspension structure, and preferably lifted free from the floor of the auxiliary unit.

In another example, the operative component is carried, e.g. on the floor or on a wall, of the auxiliary unit by the second suspension structure, and when the auxiliary unit is in the assembly position, the first suspension structure is attached between the operative component and the main frame. At that point in time, the first suspension structure and the second suspension structure both support the operative component. The second suspension structure may, in some embodiments, be removed such that the suspension is exclusively by the first suspension structure directly on the main frame.

The first suspension structure may comprise at least one bracket connected to the operative component and to the main frame, and each bracket may extend through a corresponding wall opening in an outer wall of at least one of the main unit and the auxiliary unit.

Each wall opening may have a size exceeding a cross-sectional dimension of the corresponding bracket to define a gap between an edge about the wall opening and the bracket. This allows the load on the brackets to be carried by the main frame without influencing the outer wall of the main unit or auxiliary unit.

The gap between the wall opening and the brackets may be sealed by a sealing structure, e.g. a rubber gasket extending between an edge of the wall and the bracket.

The first suspension structure may, in one embodiment, constitute or form part of the unit fixation structure. In this embodiment, the first suspension structure holds the auxiliary unit in place on the main unit.

The power conversion assembly converts the power from the generator into a desired energy form. The power conversion assembly may be configured for delivering electrical power, e.g. in AC or DC.

In case of electrical energy, the power conversion assembly may be configured for linking the generator e.g. to an external power grid. In that case, the power conversion assembly may be constituted e.g. by a converter, and/or a transformer, and/or a switch gear. Any such components may be comprised in the power conversion assembly.

The operative component may therefore be constituted by a converter and/or a transformer, and/or a switch gear etc. Such components can suitably be housed in an auxiliary unit, and advantageously be carried directly by the main unit since they are relatively heavy components. The load path from such components to the tower may therefore be as short as possible, and it is therefore an advantage to suspend such components directly on the main unit and thereby carry at least a part of the weight of these components directly by the main unit which is connected to the tower.

Additionally, the mentioned components are often supplied to the site where the wind turbine is erected by an external supplier not being involved with the drivetrain and other parts of the wind turbine. Accordingly, the encapsulation in a separate unit away from the drivetrain may be an advantage and reduce the risk of unintended access for unauthorised personnel.

Further, the converter and the transformer are high voltage components which, for safety reasons, may be separated from the main unit.

Additionally, these mentioned components are expensive and complex components for which service or replacement may suitably be carried out by specially trained staff, e.g. by lowering the operative components to the ground when housed in the auxiliary unit, or at least by working in a working area which is isolated from the rotating and potentially dangerous drivetrain.

The generator may, as an example, be an asynchronous or synchronous generator, e.g. an asynchronous or synchronous generator, and the converter voltage may be in same range as a generator voltage, sometimes referred to as Stator voltage.

The generator, in another example, may be a doubly fed induction generator (DFIG). In that case, the voltage on the converter could be different from the Generator stator voltage. The converter is connected to generator rotor, and is normally the same voltage or a voltage which is lower than the stator voltage.

Low voltage may e.g. be considered as voltages up to 1000V. Medium voltage may be considered as voltages of 1 KV to about 60 kV. The generator Voltage could be low voltage, or medium voltage.

The main unit and the auxiliary unit are assembled at the interface by a unit fixation structure. The unit fixation structure may fixate the auxiliary unit to the main unit when the auxiliary unit is an assembly position, and it may be suitable for allowing release of the auxiliary unit from the main unit at a later date after the main unit is assembled on the tower top for example for service or replacement. For that purpose, the unit fixation structure may comprise mutually interlocking structural features on the main unit and on the auxiliary unit. Examples of such mutually interlocking features may be protrusions on one of the main and auxiliary unit and indentations or holes on the other one of the main and auxiliary unit, the unit fixation structure may form a bolted interface allowing releasable joining of the main and auxiliary units, or the auxiliary unit may be held in place on the main unit by cables by which the auxiliary unit can be lowered to the ground for service, replacement of components, or for transport of components and personnel between ground and the nacelle. In one embodiment, the unit fixation structure is configured such that the auxiliary unit can be received by the main unit when the auxiliary unit is lowered in close vicinity to the main unit. Such a unit fixation structure may be constituted by hooks or by interlocking structures on the main unit and the auxiliary unit. This may particularly be combined with a first suspension structure configured to receive the load of the operative component upon the movement of the auxiliary unit to the position where the unit fixation structure fixates the auxiliary unit on the main unit.

The operative component is accommodated in the auxiliary unit but suspended directly on the main unit, e.g. directly on the main frame in the main unit. Herein that means that at least a part of the load of the operative component is transferred directly to the main unit without loading the auxiliary unit or the unit fixation structure. This load is herein referred to as the direct load.

The direct load does not necessarily constitute the entire load caused by the operative component accommodated in the auxiliary unit but is a major part thereof. Thus, the direct loads may e.g. constitute anything e.g. from 50 percent to 100 percent of the total load caused by the operative component accommodated in the auxiliary unit and suspended direction on the main unit. Particularly, the direct load may constitute 100 percent of the total load meaning that the operative component is entirely carried by the main unit. The weight of the operative component in a 5 MW wind turbine may as an example be 25-30 ton (transformer and/or converter), and the weight of an auxiliary unit for housing such a component may be 5-15 tons. Accordingly, to pass the load of the operative component at least partly to the main unit and particularly to the main frame may be an advantage.

The direct load is neither transferred to the auxiliary unit, nor transferred to the main unit via the auxiliary unit—rather, it is transferred directly to the main unit e.g. directly to the main frame.

The main unit and the auxiliary unit may be arranged side by side in a direction away from the rotational axis. This means that the auxiliary unit is shifted sideways away from the rotational axis relative to the main unit. The auxiliary unit may e.g. be in a direction perpendicular to a rotational axis of the wind turbine rotor. This provides for an advantageous modularity of the nacelle with the advantageous distribution of the main wind turbine components such as to have both the main bearing system and the drivetrain system assembled in the main unit and other components in the auxiliary unit sideways shifted away from the drivetrain. Accordingly, the interface between the main unit and the auxiliary unit may particularly extend in the direction of the rotational axis.

In one embodiment, several operative components are housed in the auxiliary unit and suspended directly on the main unit. The operative component may be a transformer and a converter which is thereby housed in the same auxiliary unit.

The first suspension structure may be configured for releasable suspension of the operative component and thereby facilitate the suspension of the operative component directly on the main unit. The first suspension structure may be particularly suitable for allowing release of the operative component from the main unit. For that purpose, the first suspension structure may comprise mutually interlocking structural features on the main unit and on the operative component. Examples of such mutually interlocking features may be protrusions on one of the main unit and the operative component and indentations or holes on the other one of the main unit and the operative component, the first suspension structure may include a bolt interface allowing releasable joining of the operative component to the main unit, or the operative component may be held in place on the main unit by cables by which the operative component can be lowered to the ground for service or replacement. The first suspension structure may also constitute the interface which holds the auxiliary unit on the main unit. I.e. the auxiliary unit may be held in place on the main unit via the first suspension structure.

The second suspension structure may be configured for releasable suspension of the operative component on the auxiliary unit. In one embodiment, the second suspension structure is a support structure configured for the operative component to stand on a floor of the auxiliary unit. Such a support structure may include e.g. legs, beams, or similar structures arranged between the floor of the auxiliary unit and the operative component.

The second suspension structure may be particularly suitable for allowing release of the operative component from the auxiliary unit. For that purpose, the second suspension structure may comprise mutually interlocking structural features on the auxiliary unit and on the operative component. Examples of such mutually interlocking features may be protrusions on one of the auxiliary unit and the operative component and indentations or holes on the other one of the auxiliary unit and the operative component. The second suspension structure may include a bolt interface allowing releasable joining of the operative component to the auxiliary unit, or the operative component may be held in place in the auxiliary unit by cables by which the operative component can be lowered to the ground for service or replacement. The second suspension structure may particularly allow the auxiliary unit to carry the operative component during transportation via the second suspension structure.

As mentioned previously, the first and second suspension structure may be configured such that load is transferred from the second suspension structure to the first suspension structure when the auxiliary unit is attached to the main unit, i.e. when it is moved towards the assembly position. Alternatively, or additionally, the first suspension structure and the second suspension structure may be configured for simultaneous suspension of the operative component both to the main unit and to the auxiliary unit to thereby allow the operative component to be carried both by the main unit and by the auxiliary unit, e.g. such that a larger percentage of the load is carried by the main frame in the main unit, and a small percentage, below 50 percent, or below 10 percent is carried by the auxiliary unit. Further, the first suspension structure and the second suspension structure may be configured for automatic switching between the carrying of the operative component by the main unit to the carrying of the operative component by the auxiliary unit, vice versa.

Below, three different assembly procedures are outlined.

a) The main unit and the auxiliary unit are joined via the unit fixation structure at the ground. Subsequently, they are hoisted and attached to the tower as one assembled nacelle. Once attached to the nacelle, the operative component is attached directly to the main unit via the first suspension structure and thereby becomes suspended directly on the main unit. If the operative component is sufficiently shielded to be exposed on an outer surface of the main unit, the auxiliary unit may be released and used for subsequent transport of other components or it may remain fixed to the main unit and form part of the nacelle for continued encapsulation of the operative component.

b) The main unit and the auxiliary unit are joined via the unit fixation structure at the ground. Subsequently, the operative component is attached directly to the main unit via the first suspension structure and thereby becomes suspended directly on the main unit. The auxiliary unit may now be released and used for subsequent transport of other components, or it may remain fixed to the main unit and form part of the nacelle for continued encapsulation of the operative component. The nacelle is hoisted and attached to the tower as one assembled nacelle.

c) The main unit is hoisted and attached to the tower. Subsequently, the auxiliary unit is hoisted and joined by the unit fixation structure to the main unit. When the two units are assembled, the operative component is attached directly to the main unit via the first suspension structure and thereby becomes suspended directly on the main unit. At this point, the operative component may be attached via both the first and the second suspension structures to the main and auxiliary units, simultaneously. The auxiliary unit may now be released and used for subsequent transport of other components, or it may remain fixed to the main unit and form part of the nacelle for continued encapsulation of the operative component.

In all three scenarios, the auxiliary unit may be used as a guide for correct positioning of the operative component relative to the main unit, i.e. when the auxiliary unit is attached via the unit fixation structure, the operative component is correctly positioned for attachment to the main unit via the first suspension structure. Subsequently, the operative component can be released from the auxiliary unit via the second suspension structure whereby the auxiliary unit functions only as a shield for weather protection and/or to form an indoor working platform for maintenance of the operative component. The operative component may e.g. be released from the auxiliary unit to establish a load path from the operative component directly into the main frame in the main unit.

In all three scenarios, the auxiliary unit may be attached directly to the main unit via the interface.

The interface may provide a sealed connection preventing intrusion of air, water, and dirt into the main unit.

The auxiliary unit may also be carried by an adapter inserted between the yaw arrangement and the main unit.

At least two auxiliary units may be included in the nacelle. Two auxiliary units could be arranged on opposite sides of the main unit. In that embodiment, the two auxiliary units may be on opposite sides of a vertical plane in which the rotational axis extends.

Two auxiliary units could be arranged above each other on one side of the main unit or on both sides of the main unit. In that case, the two auxiliary units may e.g. be on opposite sides of a horizontal plane, e.g. in which the rotational axis extends. Such a plane would be determined by the rotational axis and a point horizontally adjacent the rotational axis.

Two auxiliary units could be arranged one after the other to form a row of auxiliary units and therefore separated by a vertical plane extending perpendicular to the rotational axis.

If two auxiliary units are arranged above each other or one after the other, the nacelle may comprise a third fixation structure for releasable fixation of one of the auxiliary units on the other one of the auxiliary units. In that way, one of the auxiliary units may form a load path for the other auxiliary units into the main unit and thereby to the wind turbine tower.

The third fixation structure may allow release of one of the auxiliary units from the other one of the auxiliary units. For that purpose, the third fixation structure may comprise mutually interlocking structural features on the two auxiliary units, e.g. in the form of protrusions on one unit and indentations or holes on the other one of the units.

The third fixation structure may include a bolt interface allowing releasable joining of the auxiliary units to each other.

If the two auxiliary units are arranged one above the other, the lower one of the auxiliary units may be held in place on the upper one of the auxiliary units by cables by which the lower one of the auxiliary units can be lowered to the ground for service or replacement.

Two auxiliary units may be arranged above each other or one after the other on one side of the main unit and two auxiliary units may be arranged above each other or one after the other on an opposite side of the main unit.

The operative component may comprise an electrical connector configured for electrical connection with the generator. The electrical connector may be connected via the interface between the main unit and the auxiliary unit. Particularly, this interface may be operated from the main space in the main unit and thereby allow connection or interruption of the connection without entering the auxiliary unit. Alternatively, this interface may be operated from an auxiliary space in the auxiliary unit and thereby allow connection or interruption of the connection without entering the main unit.

The main unit may particularly be configured for isolation of the rotor-supporting assembly physically separated from the operative component. The isolation may e.g. be hermetic, i.e. air-tight, isolation, or fire or waterproof isolation preventing spreading of fire or water.

The auxiliary unit may also be configured for isolation of the transformer and converter from the rotor-supporting assembly. Again, this may be hermetic isolation, or fire proof isolation, or water proof isolation.

In one embodiment, the main unit and the auxiliary units are joined in an interface forming a gap allowing air to pass e.g. from beneath the nacelle to above the nacelle, through the gap.

Such a gap may increase thermal convection and thus cooling of the space inside the main and auxiliary units.

The first suspension structure may extend across the gap through openings in walls of both the main and the auxiliary unit, and space between the openings and the first suspension structure could be sealed by a gasket, e.g. of resilient rubber or other flexible material ensuring that the load of the operative component is not transferred to the walls of the main or auxiliary unit.

A gasket may also be arranged where access ways, e.g. doors or passages for cables or bus-bars, extend across the gap. The gasket may be designed to withstand a pressure which exceeds a blowout pressure on which other pressure release structures act, e.g. said blowout panels etc.

In one embodiment, vibration dampening material is arranged between the main unit and the auxiliary unit. Rubber or foam material, or material with a similar elastically deformable and vibration dampening effect may be used. The dampening material may particularly be compressed between the main unit and the auxiliary unit and it may particularly be arranged where the main unit and the auxiliary unit are fixed by nails, rivets, bolts or any similar mechanical attachment.

In one embodiment, the main unit is broader than the auxiliary unit(s). That the main unit is "broader" means that its dimension in a horizontal plane, and perpendicular to the rotational axis is larger than the same dimension of the auxiliary unit(s). The main unit may particularly be broader than a shipping freight container following the dimensional and structural specifications in the ISO standard of ISO 668:2013 for series 1 freight containers, whereas the auxiliary unit(s) may have the size of, or be smaller than what is specified for those ISO standard, ISO 668:2013, series 1 freight containers.

The nacelle may comprise a crane structure attached to the main unit and configured to hoist the auxiliary unit in a vertical direction from ground to a position where the unit fixation structure can connect the auxiliary unit to the main unit. This means that the crane structure is configured to hoist the auxiliary unit vertically without having to move it in other directions. This hoisting procedure is particularly suitable in combination with the unit fixation structures comprising rotatable or slidable hooks facilitating attachment without necessitating relative movement between the main and auxiliary units in other directions than vertical.

The crane may e.g. include a cantilever beam structure movable between a suspended and a retracted configuration. In the suspended configuration, the cantilever beam structure forms at least one and optionally several outwards projecting cantilevers configured to carry an auxiliary unit and usable for hoisting an auxiliary unit towards and away from the main unit. The outwards projecting cantilever beam structure may particularly be attached on a roof part of the main unit.

In one embodiment, the power conversion assembly is configured for converting electrical power from the generator into chemically stored forms of energy, e.g. into hydrogen, ammonia, or methanol. The operative component may therefore be constituted by an electrolysis cell stack, or a battery etc. Such components can suitably be housed in an auxiliary unit, and advantageously be carried directly by the main unit since they are relatively heavy components.

In a second aspect, the disclosure provides a method of assembling a wind turbine. According to this method, the main unit may be transported to a place where the wind turbine is erected. The auxiliary unit may e.g. be prepared by a supplier of the operative component and received to the site of erection of the wind turbine including the operative component, and the operative component is attached to the main unit while it is contained in the auxiliary unit.

Particularly, the method may comprise attaching the operative component directly to a main frame which forms part of a load path from the rotor to the wind turbine tower.

During an initial phase of the assembly, the operative component could be carried by the auxiliary unit. During the installation, the operative component, while carried in the auxiliary unit is lifted to the position where the auxiliary unit can be attached to the main unit. Herein, that position is called "the assembly position". When reaching the assembly position, the load of the operative component is moved from the auxiliary unit to the main unit, and particularly to the main frame in the main unit.

In one embodiment, load is transferred from the second suspension structure to the first suspension structure while moving the auxiliary unit towards the assembly position wherein the unit fixation structure connects the auxiliary unit to the main unit.

In a third aspect, the disclosure provides a method of servicing a wind turbine according to the first aspect. According to this method, the operative component is detached from the main unit while it is contained in the auxiliary unit and lowered to the ground in the auxiliary unit for service or replacement at ground.

The main unit and the auxiliary unit may be categorised as two different safety categories with different regulations relative to fire, toxic escape, temperature, or electricity.

In further aspects, the disclosure provides a wind turbine nacelle configured for mounting on a wind turbine tower, the nacelle comprising:
a main unit arranged to be connected to the wind turbine tower and housing the rotor-supporting assembly, and
at least one auxiliary unit.

In this aspect, the main unit and the auxiliary unit are separate units configured to be connected by a unit fixation structure at an interface, and the main unit comprises a crane structure attached to the main unit and configured to hoist the auxiliary unit in a vertical direction from ground to a position where the unit fixation structure can connect the auxiliary unit to the main unit. Particularly, the unit fixation structure may comprise a movable support structure, e.g. in the form of the pivotable or slidable hook disclosed herein.

LIST OF NUMBERED EMBODIMENTS

1. A wind turbine nacelle (2) configured for mounting on a wind turbine tower (3) and housing a rotor-supporting assembly, a generator (33), and a power conversion assembly, the nacelle comprising:
a main unit (20, 72, 101, 121, 192) arranged to be connected to the wind turbine tower (3) and housing the rotor-supporting assembly, and
at least one auxiliary unit (21, 22, 61, 62, 71, 102, 122, 191) housing an operative component (34, 35, 77, 104) forming part of the power conversion assembly,
wherein:
the main unit (20, 72, 101, 121, 192) and the auxiliary unit (21, 22, 61, 62, 71, 102, 122, 191) are separate units configured to be connected by a unit fixation structure at an interface, and
the operative component (34, 35, 77, 104) is suspended directly on the main unit (20, 72, 101, 121, 192).

2. The nacelle according to embodiment 1, wherein the main unit (20, 72, 101, 121, 192) houses the generator (33).

3. The nacelle according to embodiment 1 or 2, wherein the main unit (20, 72, 101, 121, 192) and the auxiliary unit (21, 22, 61, 62, 71, 102, 122, 191) are arranged side by side in a direction away from a rotational axis defined by the rotor-supporting assembly.

4. The nacelle according to any of the preceding embodiments, wherein the operative component (34, 35, 77, 104) is suspended directly on a main frame (106) in the main unit (20, 72, 101, 121, 192).

5. The nacelle according to any of the preceding embodiments, wherein the operative component (34, 35, 77, 104) is an electrolysis cell stack, a transformer, or a converter.

6. The nacelle according to any of the preceding embodiments, comprising a first suspension structure (78) for releasable suspension of the operative component (34, 35, 77, 104) to the main unit (20, 72, 101, 121, 192) thereby facilitating the suspension of the operative component (34, 35, 77, 104) directly on the main unit (20, 72, 101, 121, 192).

7. The nacelle according to any of the preceding embodiments, comprising a second suspension structure (78, 91) for releasable suspension of the operative component (34, 35, 77, 104) to the auxiliary unit (21, 22, 61, 62, 71, 102, 122, 191).

8. The nacelle according to embodiments 6 and 7, wherein the first suspension structure and the second suspension structure is configured for simultaneous suspension of the operative component (34, 35, 77, 104) both to the main unit (20, 72, 101, 121, 192) and to the auxiliary unit (21, 22, 61, 62, 71, 102, 122, 191).

9. The nacelle according to any of the preceding embodiments, comprising at least two auxiliary units (21, 22, 61, 62, 71, 102, 122, 191)s.

10. The nacelle according to embodiment 9, wherein two auxiliary units (21, 22, 61, 62, 71, 102, 122, 191) are arranged on opposite sides of the main unit (20, 72, 101, 121, 192).

11. The nacelle according to embodiment 10, wherein two auxiliary units (21, 22, 61, 62, 71, 102, 122, 191) are on opposite sides of a horizontal plane unit to form a lower and an upper auxiliary unit (21, 22, 61, 62, 71, 102, 122, 191).

12. The nacelle according to any of embodiments 11, wherein two auxiliary units (21, 22, 61, 62, 71, 102, 122, 191) are arranged above each other on one side of the main unit (20, 72, 101, 121, 192) and two auxiliary units (21, 22, 61, 62, 71, 102, 122, 191) are arranged above each other on an opposite side of the main unit (20, 72, 101, 121, 192) to form a lower and an upper auxiliary unit (61, 62) on opposite sides of the main unit (20, 72, 101, 121, 192).

13. The nacelle according to embodiment 12, wherein the main unit (20, 72, 101, 121, 192) comprises a third fixation structure for releasable fixation of the lower auxiliary unit (62) to the upper auxiliary unit (61).

14. The nacelle according to any of the preceding embodiments, wherein the operative component (34, 35, 77, 104) comprises an electrical connector configured for electrical connection with the generator in the main unit (20, 72, 101, 121, 192), and wherein the electrical connector is connected via the interface between the main unit (20, 72, 101, 121, 192) and the auxiliary unit (21, 22, 61, 62, 71, 102, 122, 191).

15. The nacelle according to any of embodiments 5-14, wherein the main unit (20, 72, 101, 121, 192) defines an enclosed space housing the rotor-supporting assembly whereby the transformer and converter are physically separated from the main unit.

16. The nacelle according to any of the preceding embodiments, wherein the auxiliary unit (21, 22, 61, 62, 71, 102, 122, 191) is configured for isolation of the operative component (34, 35, 77, 104) from the rotor-supporting assembly.

17. The nacelle according to any of the preceding embodiments, wherein the interface between the main unit (20, 72, 101, 121, 192) and the auxiliary unit (21, 22, 61, 62, 71, 102, 122, 191) defines a gap (167) allowing air to pass between a surface of the main unit (20, 72, 101, 121, 192) and a facing surface of the auxiliary unit (21, 22, 61, 62, 71, 102, 122, 191).

18. The nacelle according to any of the preceding embodiments, comprising a crane structure attached to the main unit and configured to hoist the auxiliary unit from ground to a position where the unit fixation structure can connect the auxiliary unit to the main unit.

19. The nacelle according to embodiment 18, wherein the crane structure is configured to hoist the auxiliary unit in a vertical direction without moving it in horizontal direction.

20. A method of assembling a wind turbine with a nacelle according to any of embodiments 1-19, wherein:
the main unit (20, 72, 101, 121, 192) is received to a site of erection of the wind turbine, including the operative component (34, 35, 77, 104),
the auxiliary unit (21, 22, 61, 62, 71, 102, 122, 191) is attached to the main unit (20, 72, 101, 121, 192);
and the operative component (34, 35, 77, 104) is attached directly to the main unit (20, 72, 101, 121, 192) while it is contained in the auxiliary unit (21, 22, 61, 62, 71, 102, 122, 191).

21. The method according to embodiment 20, wherein the operative component (34, 35, 77, 104) is attached directly to a main frame in the main unit (20, 72, 101, 121, 192).

22. The method according to embodiment 20 or 21, wherein the main unit is attached to wind turbine tower, and the auxiliary unit is hoisted to, or lowered from the main unit by use of a crane structure attached to the main unit.

23. The method according to embodiment 22, wherein the auxiliary unit is hoisted only in a vertical plane by use of the crane structure.

24. A method of servicing a wind turbine with a nacelle according to any of embodiments 1-19, wherein the operative component (34, 35, 77, 104) is detached from the main unit (20, 72, 101, 121, 192) while it is contained in the auxiliary unit (21, 22, 61, 62, 71, 102, 122, 191) and lowered to the ground in the auxiliary unit (21, 22, 61, 62, 71, 102, 122, 191) for service or replacement at ground.

LIST OF DRAWINGS

Figure 1B:
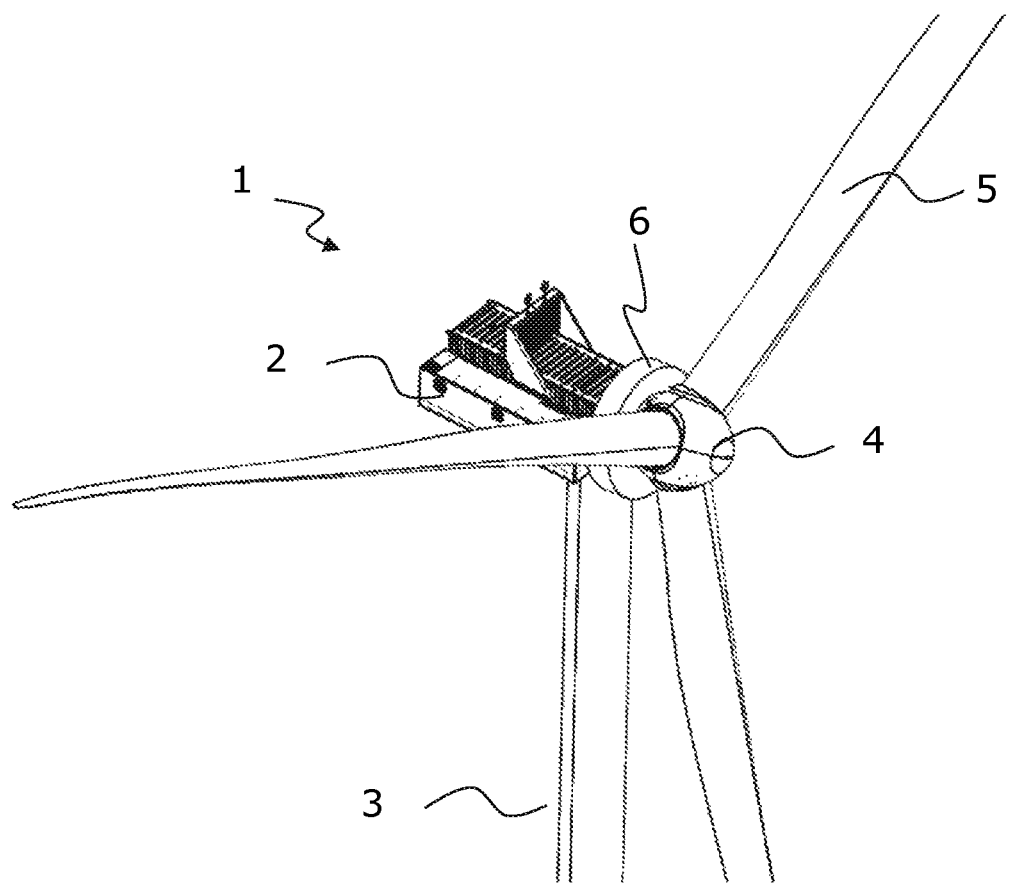
Figure 2:
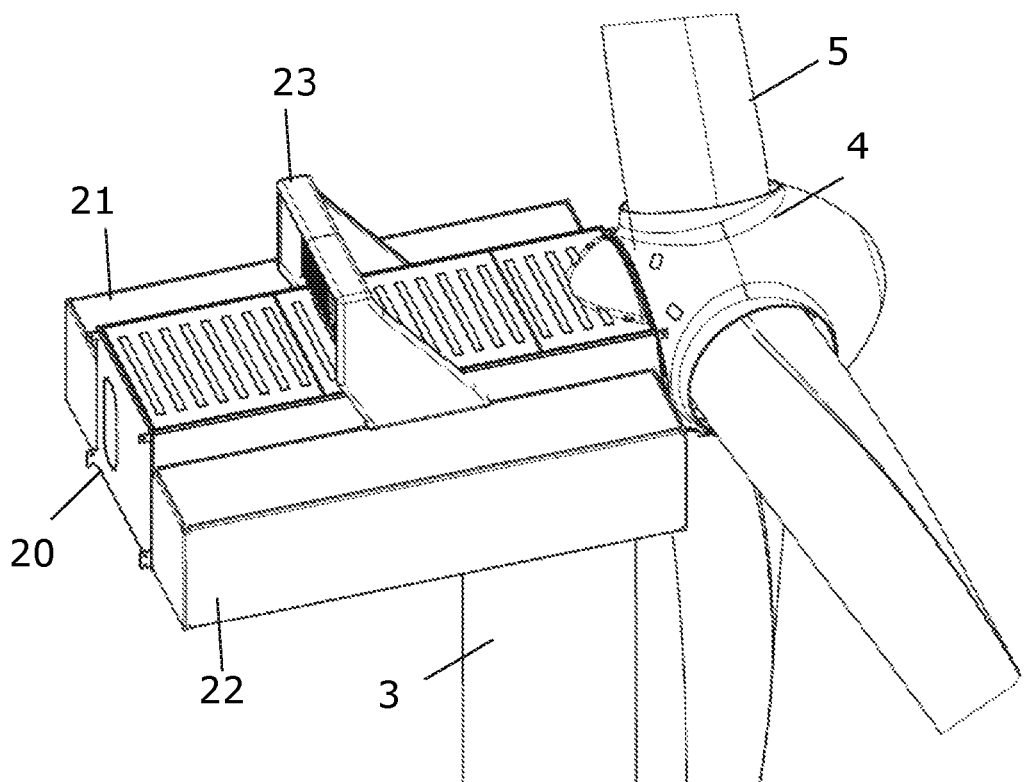
Figure 3:
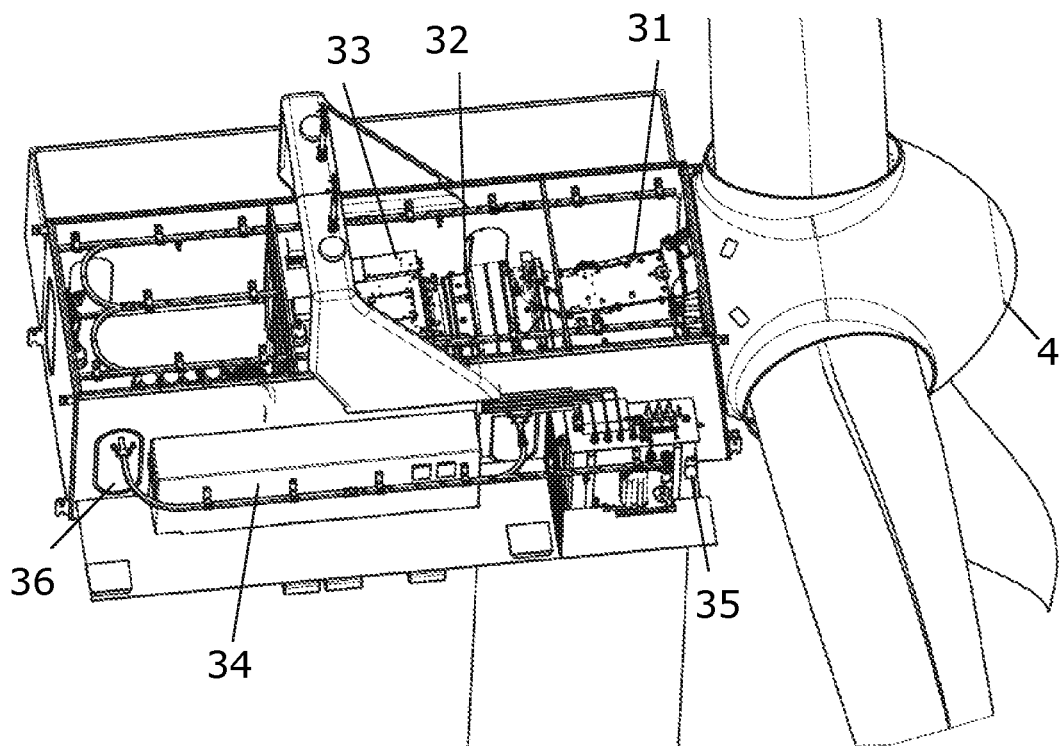
Figure 4:
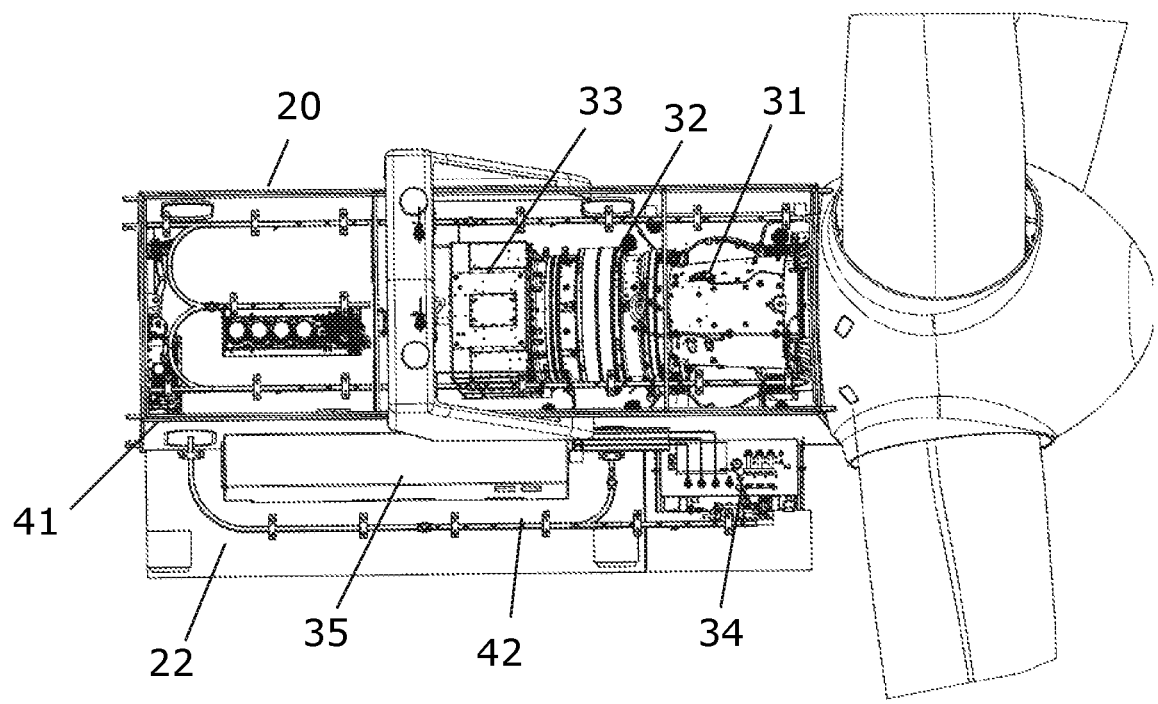
Figure 5:
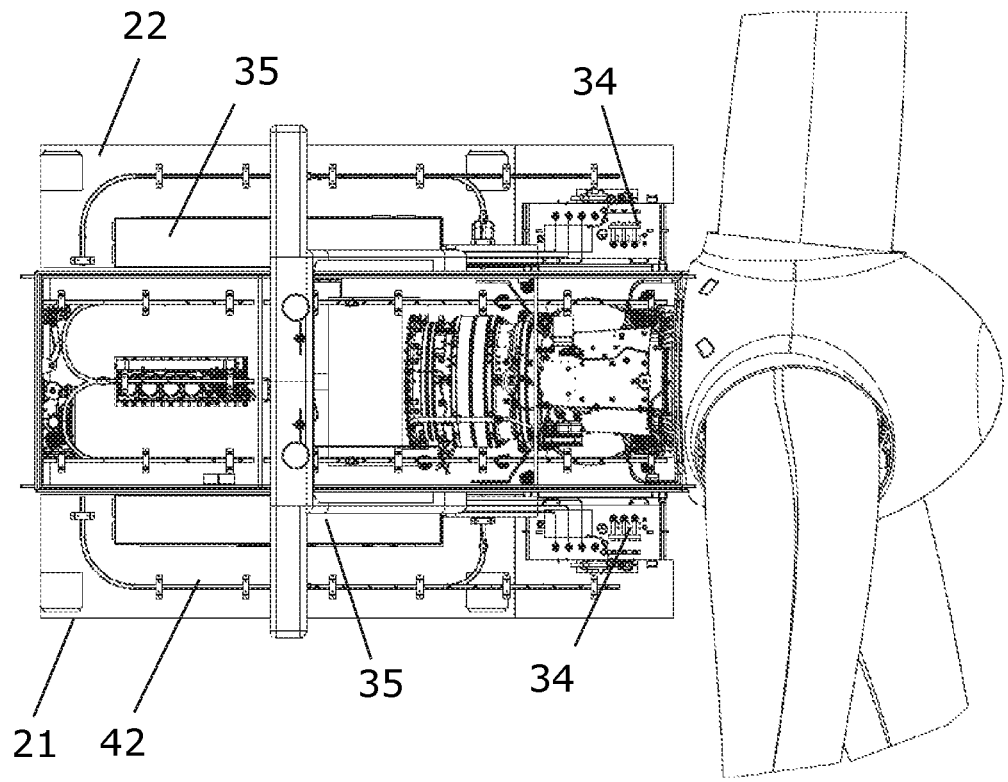
Figure 6:
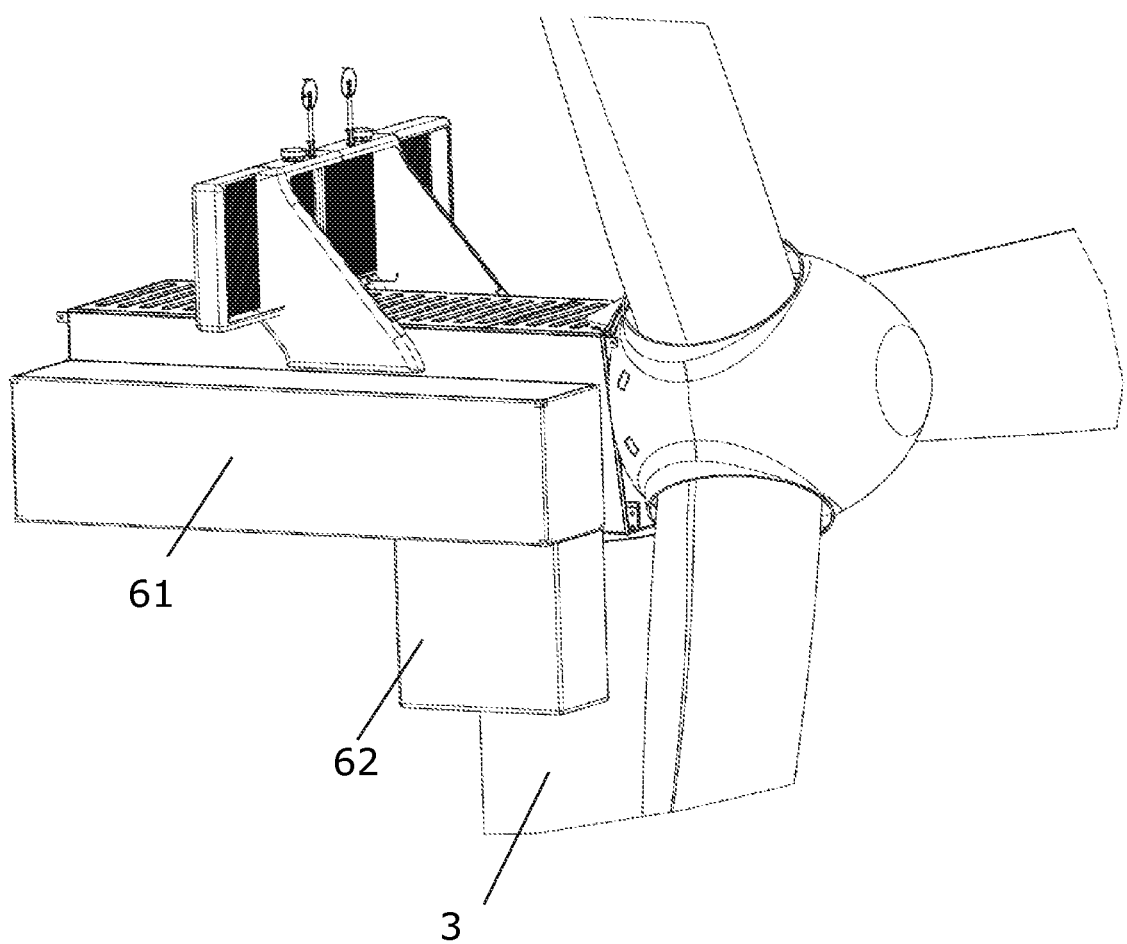
Figure 7:
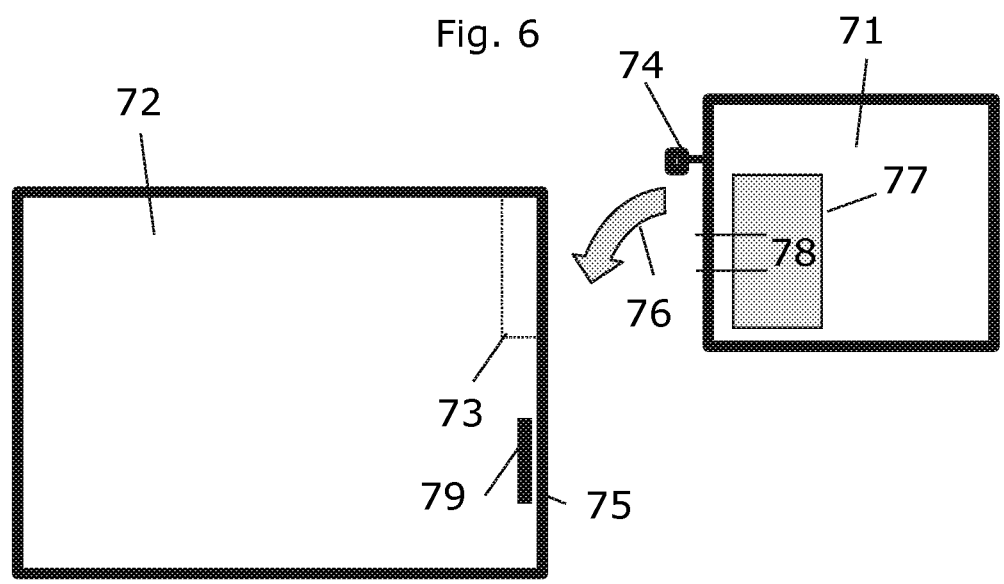
Figure 8:
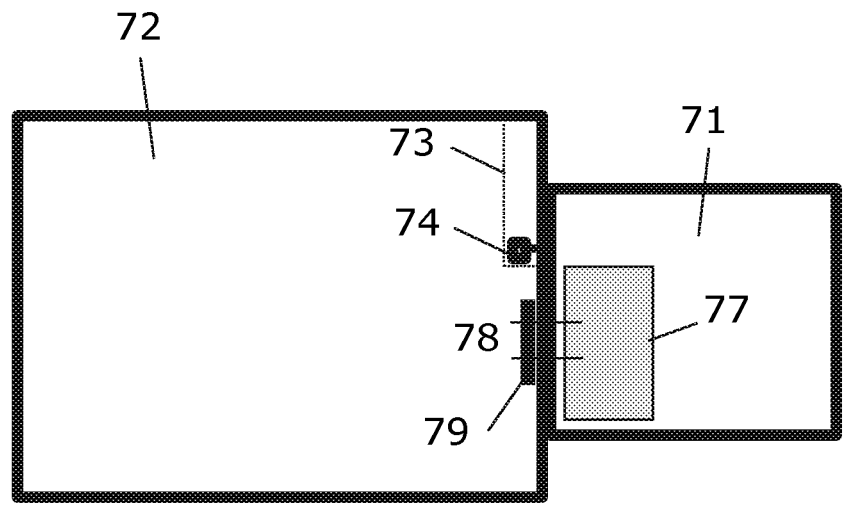
Figure 9:
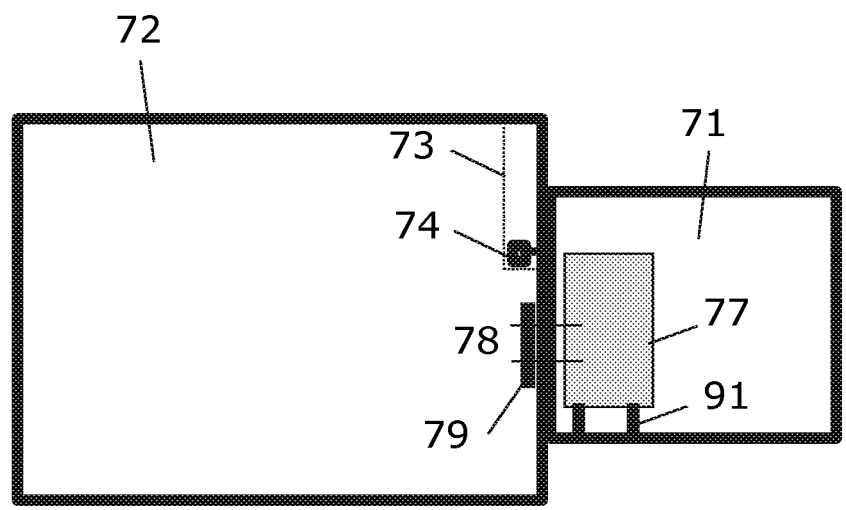
Figure 10:
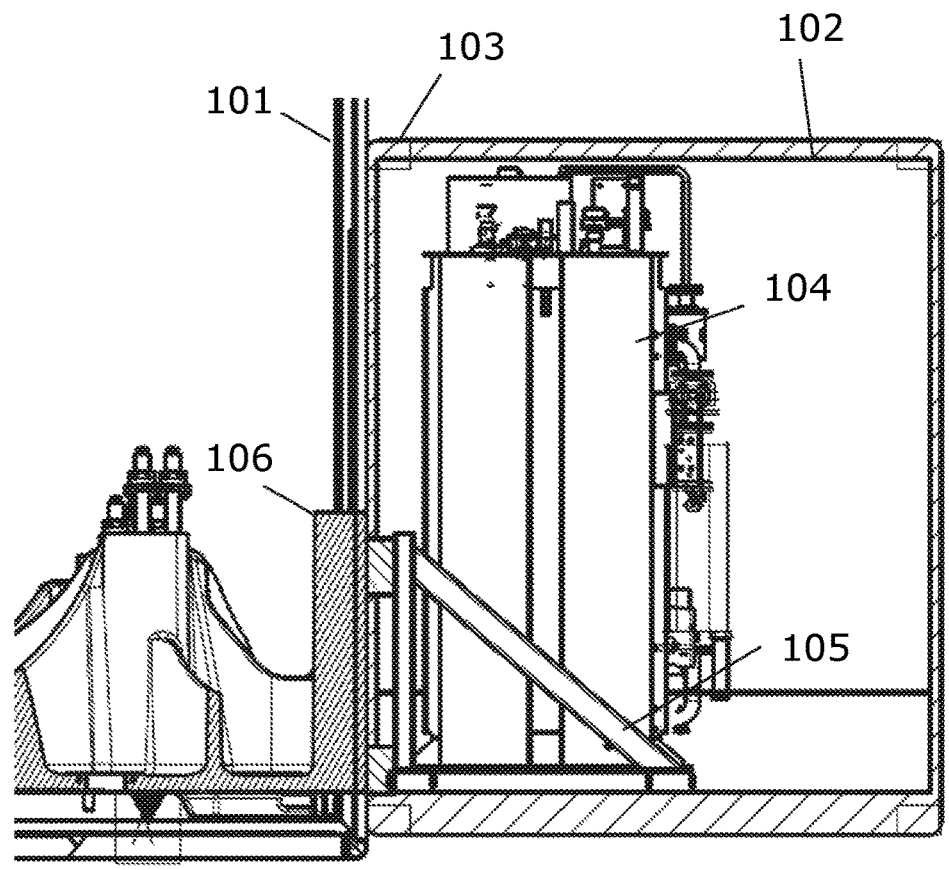
Figure 11:
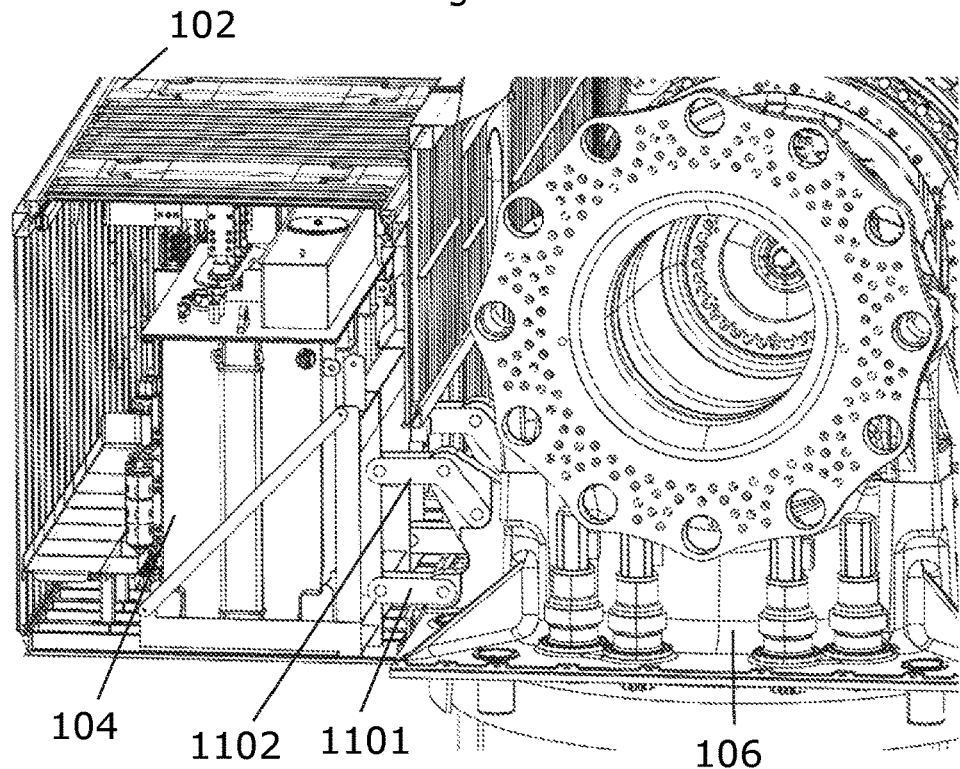
Figure 16:
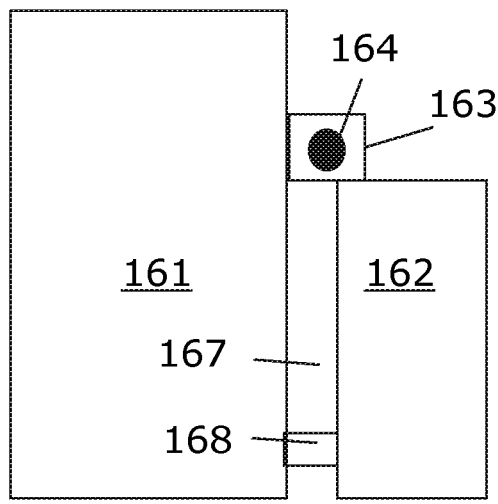
Figure 17:
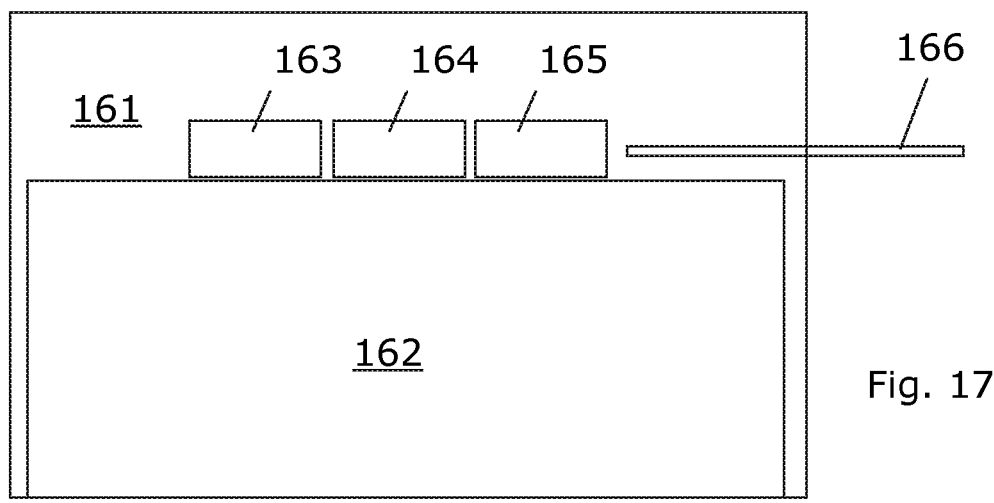
Figure 18:
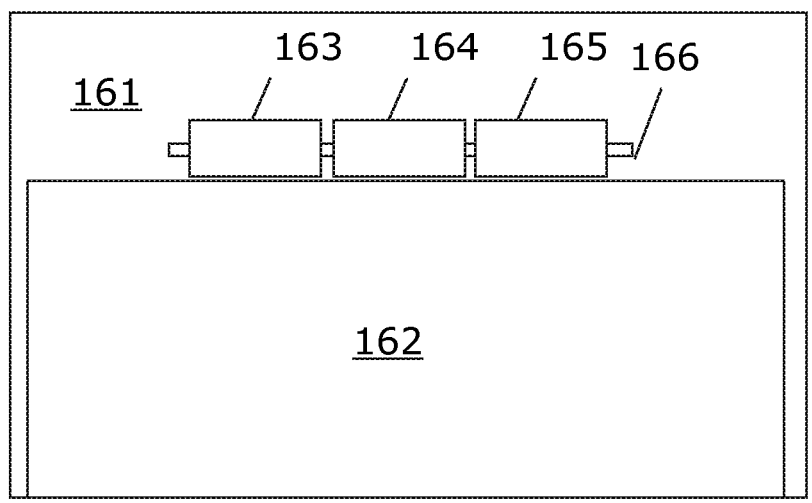
Figure 20:
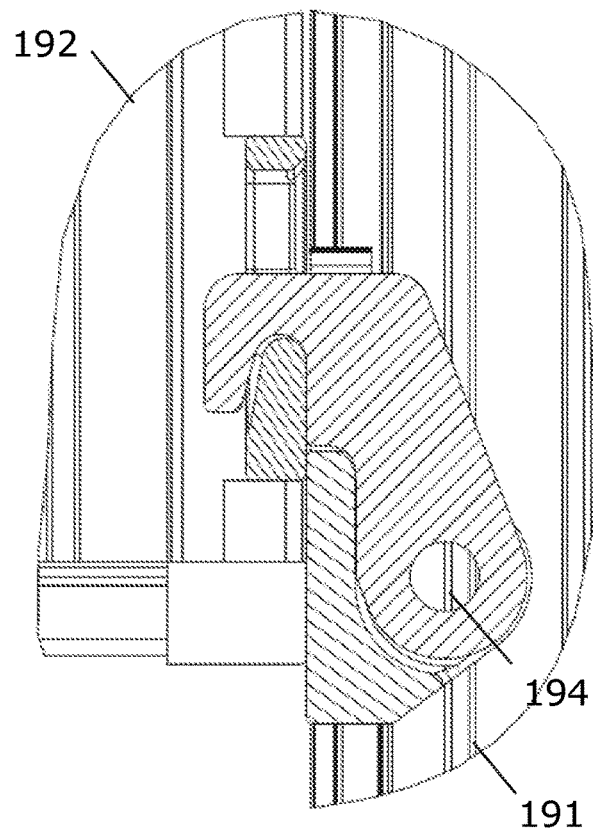
Figure 21:
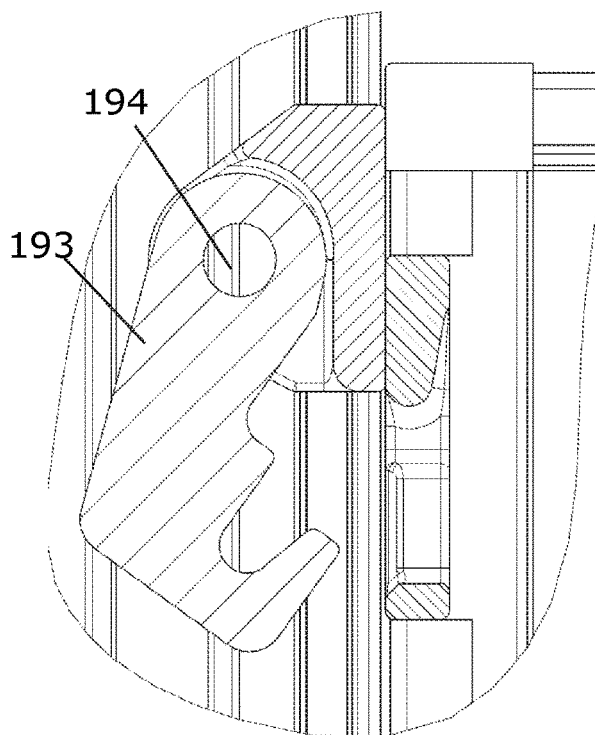
Figure 22:
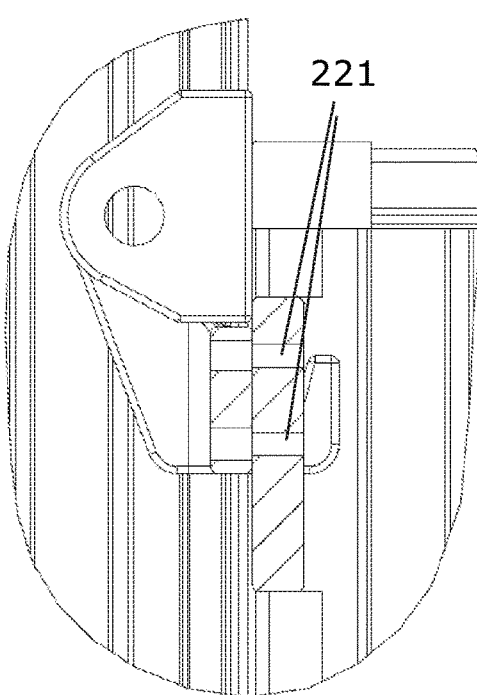
Figure 26:
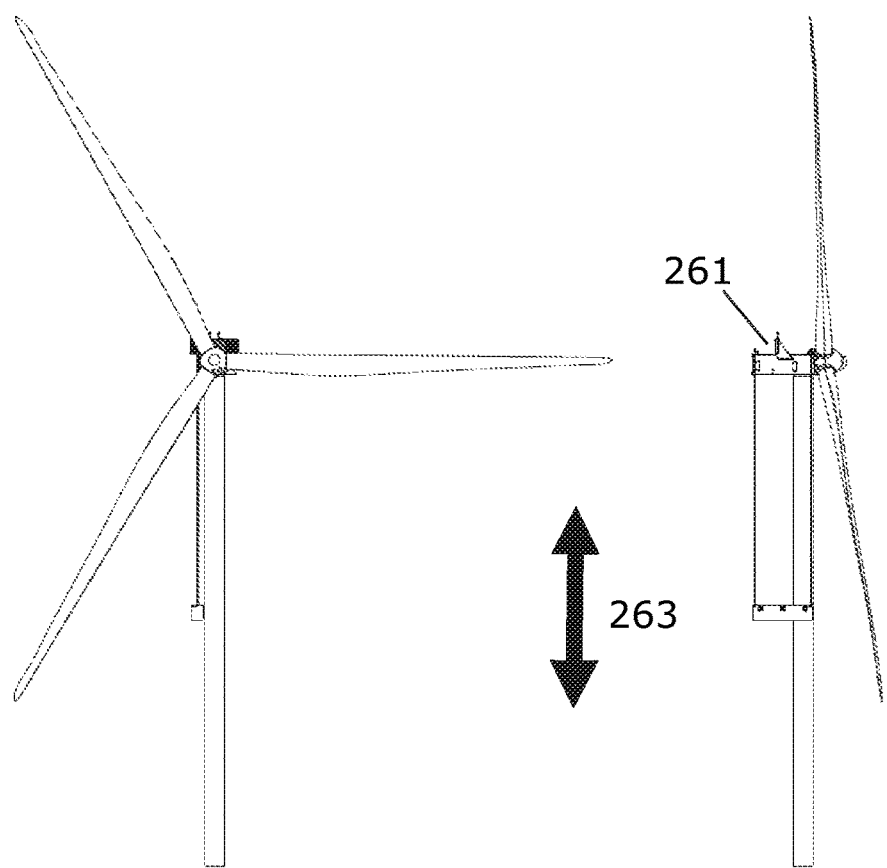
Figure 27:
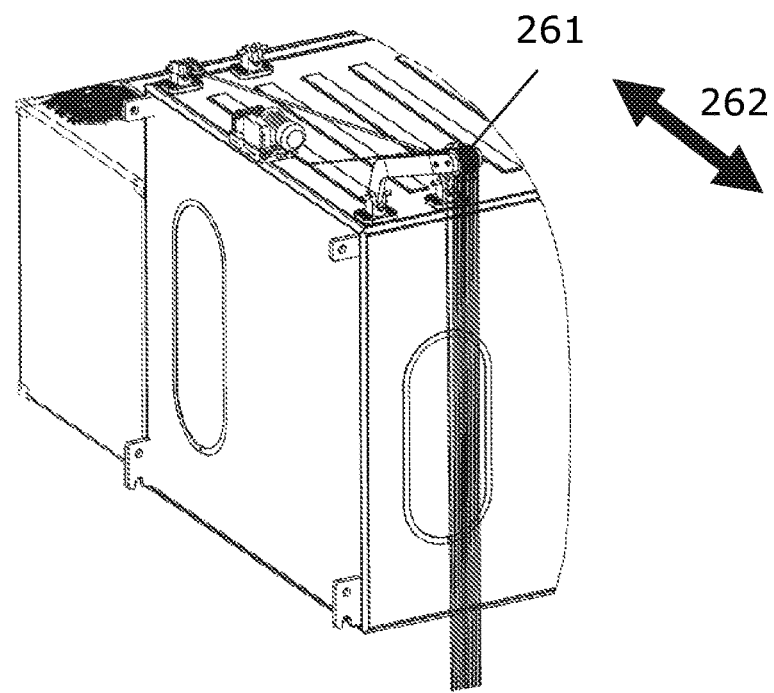
Figure 28:
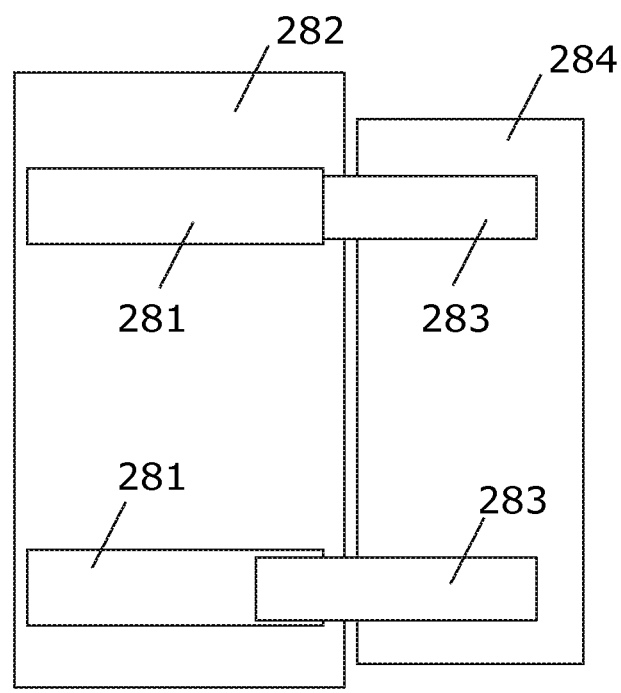

In the following, embodiments of the disclosure will be described in further details with reference to the drawing in which:

FIGS. 1a and 1b illustrate wind turbines;
FIG. 2 illustrates the nacelle of the wind turbine;
FIG. 3 illustrates a perspective view of the nacelle of FIG. 2;
FIG. 4 illustrates the nacelle from FIG. 3 but seen from above;
FIG. 5 illustrates an embodiment where the left and right-side auxiliary units contain identical components;
FIG. 6 illustrates an embodiment where two auxiliary units 61, 62 are located one above the other;
FIG. 7 illustrates schematically details of the interface;
FIG. 8 illustrates the main unit and auxiliary unit from FIG. 7 after the auxiliary unit has been attached to the main unit;
FIG. 9 illustrates an embodiment, where the first suspension structure is constituted by bolt shaped fixation pins;
FIGS. 10, 11 illustrate in further details another embodiment of the first and second suspension structures;
FIGS. 12-15 illustrate 4 different embodiments of interfaces between the main unit and the auxiliary unit.
FIGS. 16-18 illustrate an embodiment where the main unit and auxiliary units are assembled by a hinge structure;
FIGS. 19, 20 illustrate further details of a hook for attaching the auxiliary unit to the main unit;
FIG. 21 illustrates the hook in an open position where the auxiliary unit is free to be lowered to the ground;
FIG. 22 illustrates a cross section with two bolt holes for attachment of the auxiliary unit on the main unit;
FIGS. 23, 24, 25 illustrate an embodiment where the hook is configured for sliding; and
FIGS. 26-28 illustrate embodiments of cranes on the main unit for hoisting the auxiliary units.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct the rotor into the wind.

FIG. 3 illustrates a perspective view of the nacelle 2 of FIG. 2. In FIG. 3 the outer walls of the nacelle 2 are (for the sake of explanation) transparent, thereby revealing the interior parts of the nacelle 2 and the wind turbine components accommodated therein. The main unit 20 accommodates a main bearing unit 31 supporting a main shaft for rotation therein, a gear arrangement 32 and a generator 33, arranged sequentially behind the hub 4, along a direction defined by the rotational axis of the hub 4. The components in the main unit primarily form part of the drivetrain.

The auxiliary unit 22 accommodates a transformer unit 34, and a converter unit 35 which herein constitute two different operative components being accommodated in the auxiliary unit but carried by the main unit. In alternative embodiments, the operative component could be an electrolysis cell stack or a battery.

Each auxiliary unit 21, 22 is mounted along a side of the main unit 20 by a unit fixation structure. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20.

The main unit and the auxiliary units are enclosed and optionally sealable units such that one compartment is formed by the auxiliary unit, defining an auxiliary space and another compartment is formed by the main unit, defining a main space. That allows the drivetrain to be isolated from the converter and transformer. The two compartments may be joined by the cooperating openings 36 allowing personnel and equipment to enter from the main space in the main unit into the auxiliary space in the auxiliary unit. The openings 36 may be sealed and thereby prevent fire etc. from spreading from one of the main and auxiliary unit to the other one of the main and auxiliary unit.

FIG. 4 illustrates a nacelle seen from above.

FIG. 5 illustrates an embodiment where the left and right-side auxiliary units contain at least one identical component establishing a weight balance and a double function. The double function means that the wind turbine comprises two similarly functioning components, one contained in each of the auxiliary units. The components may be identical in nature and specification. In case of component failure of one unit, the wind turbine may continue operation on reduced power while the operative component in the other auxiliary unit is replaced.

FIGS. 4 and 5 illustrate a transport system comprising a rail 42 extending from the main unit into the auxiliary unit and allowing easy handling of spare parts etc.

In FIGS. 2-5, the auxiliary units are constituted by elements having generally the shape and size of standardised freight containers such as a 40 foot shipping freight containers having a dimension and structural specifications as provided by the ISO standard, ISO 668:2013 for series 1 freight containers. The auxiliary units are attached to the main unit by the ISO-corner lifting structure, typically moulded in steel and constituting a particularly strong interface to the container.

FIG. 6 illustrates an embodiment where two auxiliary units 61, 62 are located one above the other. In this embodiment, the upper auxiliary unit 61 is constituted by a unit having the size and shape of a 40 foot shipping freight container, and the lower auxiliary unit 62 is constituted by a unit having the size and shape of a 20 foot shipping freight container. Both containers have a dimension and structural specifications as provided by the ISO standard, ISO 668: 2013, and the auxiliary units are attached to each other mainly by the corner lifting arrangements of the 20 foot container, and partly by the corner lifting arrangement of the 40 foot container. Alternatively, both auxiliary units have the same length.

FIG. 7 illustrates schematically details of the interface. The interface joins the auxiliary unit 71 and the main unit 72 in a releasable manner and allows the auxiliary unit to be attached to the main unit after transport to the installation site, or to be replaced e.g. during maintenance. In the disclosed embodiment, the auxiliary unit 71 is attached to the main unit 72 independently of any other units, and the unit fixation structure is constituted by an inward groove or track 73 in the main unit. The track 73 is illustrated with a dotted line and defines a recess into the outer surface 75. The track has a C-shaped profile in a horizontal cross section, i.e. when seen from above, the track is configured to receive the projection 74 provided on the auxiliary unit, and particularly it can receive the projection 74 through a procedure where the auxiliary unit 71 is lowered down along the outer surface 75 of the main unit 72. This is illustrated by the arrow 76. This procedure allows easy replacement of an auxiliary unit and the operative component accommodated therein without detachment of the other auxiliary unit and the operative component accommodated therein.

The main unit may form a load path from the operative component, which is housed in the auxiliary unit, down into the tower, e.g. via the main frame. Particularly, this load path may be different from the load path from the auxiliary unit into the tower. In the following, this is explained relative to different embodiments.

The auxiliary unit 71 accommodates a converter 77 which is fixed to the auxiliary unit by the second suspension structure constituted by the bolt shaped fixation pins 78.

The main unit has a strengthening bracket 79 attached to the outer wall and configured for receiving the weight of the converter 77 when the auxiliary unit is received and fixed on the main unit.

FIG. 8 illustrates the main unit and auxiliary unit from FIG. 7 after the auxiliary unit has been attached to the main unit. In this state, the bolt shaped fixation pins 78 are extended sideways to the left and thereby engage into the strengthening bracket feature 79. The bracket may be connected to a rigid frame in the main unit, e.g. supported by the main frame to thereby direct loads from the operative component directly into the tower via the main frame.

The bolt shaped fixation pins now constitute the first suspension structure by which the converter is carried directly by the main unit. The first suspension structure forms part of a load path from the operative component into the tower, and the interface between the main unit and the auxiliary unit forms part of another load path from the auxiliary unit into the tower.

In the illustrated embodiment of FIGS. 7-8, the first and second suspension structures are both constituted by the same set of bolts which extend from the converter and into one or both of either the auxiliary unit or main unit.

FIG. 9 illustrates an embodiment, where the first suspension structure is constituted by bolt shaped fixation pins and the second suspension structure is constituted by support legs 91 between a bottom of the converter and the bottom of the auxiliary unit.

FIG. 10 illustrates in further details another embodiment of the first and second suspension structures. In this embodiment, the main unit 101 and the auxiliary unit 102 are joined by the unit fixation structure constituted by the corner lifting points 103 of the container which constitutes the auxiliary unit 102.

The transformer 104 is carried by the first suspension structure, here in the form of a support frame 105 resting on the bottom of the auxiliary unit 102 and it is suspended directly on the main frame 106 inside the main unit 101. The main frame thereby forms part of the load path for the operative component into the tower.

At least 50 percent of the weight of the transformer 104 is thereby carried by the main unit 101 and the remaining weight is carried by the auxiliary unit 102, which is again carried by the main unit 101. That remaining part of the weight is thereby not carried directly by the main unit 101.

FIG. 11 illustrates an embodiment comparable to the embodiment in FIG. 10 but where the suspension structure 105 comprises the support frame 105 suspended via a bracket structure comprising lower brackets 1101 and upper brackets 1102 which is placed on the main frame 106 inside the main unit 101. The main frame thereby forms a load path for the operative component into the tower.

FIGS. 12-15 illustrate four different embodiments of the unit fixation structure forming the interfaces between the main unit and the auxiliary unit. In each of these four illustrations, the main unit 121 and the auxiliary unit 122 are connected by cooperating structures forming the unit fixation structure and being described in further details below.

Figure 12:
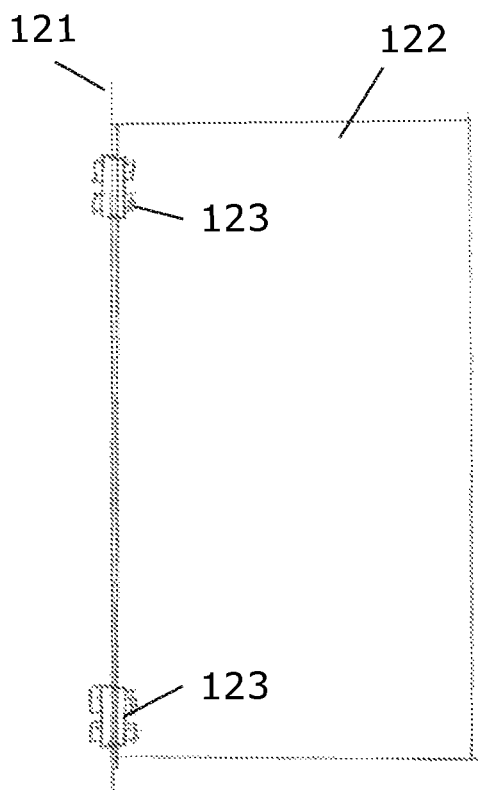

In FIG. 12, the cooperating structures are constituted by brackets 123 by which the main and auxiliary units are joined by bolts.

Figure 13:
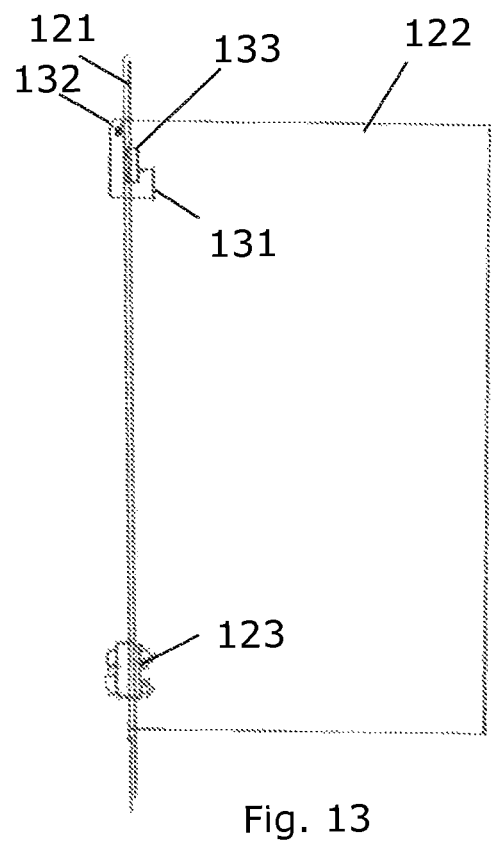

In FIG. 13, the cooperating structures are constituted by a lower bracket 123 like the one used in FIG. 12. At the upper edge, the main unit and auxiliary unit are assembled by a hook 131 pivotally joined to the main unit at the hinge point 132. The hook can rotate as indicated by the arrow 133 and engages the edge-bracket 134 of the auxiliary unit when in the illustrated position. When the lower bracket 123 is removed, and the hook 131 is rotated into the main unit, the auxiliary unit can be lowered to the ground.

Figure 14:
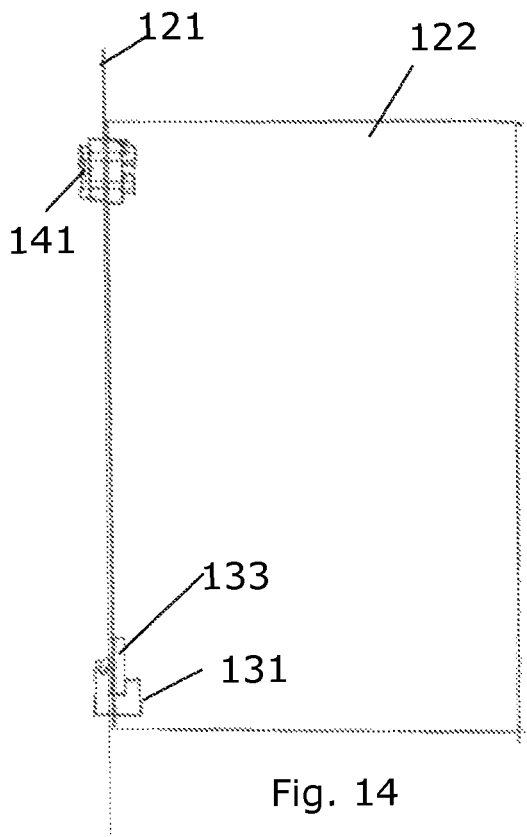

The embodiment in FIG. 14 is comparable to the embodiment in FIG. 13, but where the lower bracket is replaced with an upper bracket 141, and the hook is placed at a lower edge.

Figure 15:
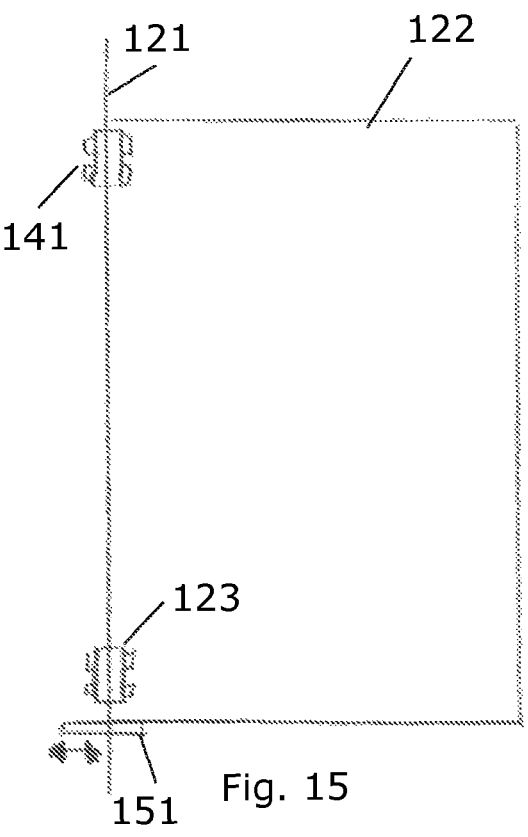

In FIG. 15, a lower and an upper bracket is used for bolting the auxiliary unit to the main unit, and a slidable support 151 supports the lower surface of the auxiliary unit while the bolts are attached. If it is desired to lower the auxiliary unit to the ground, e.g. for replacement or maintenance of the operative component, the slidable support can be slid to the left and the auxiliary unit can be lowered down, e.g. by use of a crane build into the main unit.

In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower.

In addition to the hook and bracket unit fixation structure illustrated in FIGS. 12-15, a first suspension structure (not shown) connects an operative component (not shown) directly to the main frame inside the main unit.

FIGS. 16-18 illustrate an embodiment of the unit fixation structure where the main unit and auxiliary units are assembled by a hinge structure comprising hinge elements 163, 164, 165 with a hole for receiving a hinge pin 166 extending through the hinge elements. FIG. 16 further shows that the interface forms a gap 167 allowing air to pass e.g. from beneath the nacelle to above the nacelle, through the gap. The gap is held open at the bottom by the distance element 168, which could be constituted by a number of pins or an open structure allowing air to pass between the units.

Such a gap may increase thermal convection and thus cooling of the space inside the main and auxiliary units. The gap is not limited to the embodiment with the hinge structure but could be combined with any other assembly method. The first suspension structure may extend across the gap.

FIGS. 17 and 18 illustrate the hinge elements 163, 164, 165 and the hinge pin 166. In FIG. 17, the hinge elements are positioned correctly relative to the each other such that the hinge pin can be slid into the hinge elements. In FIG. 18, the hinge pin is inserted through the holes of the hinge elements.

Figure 19A:
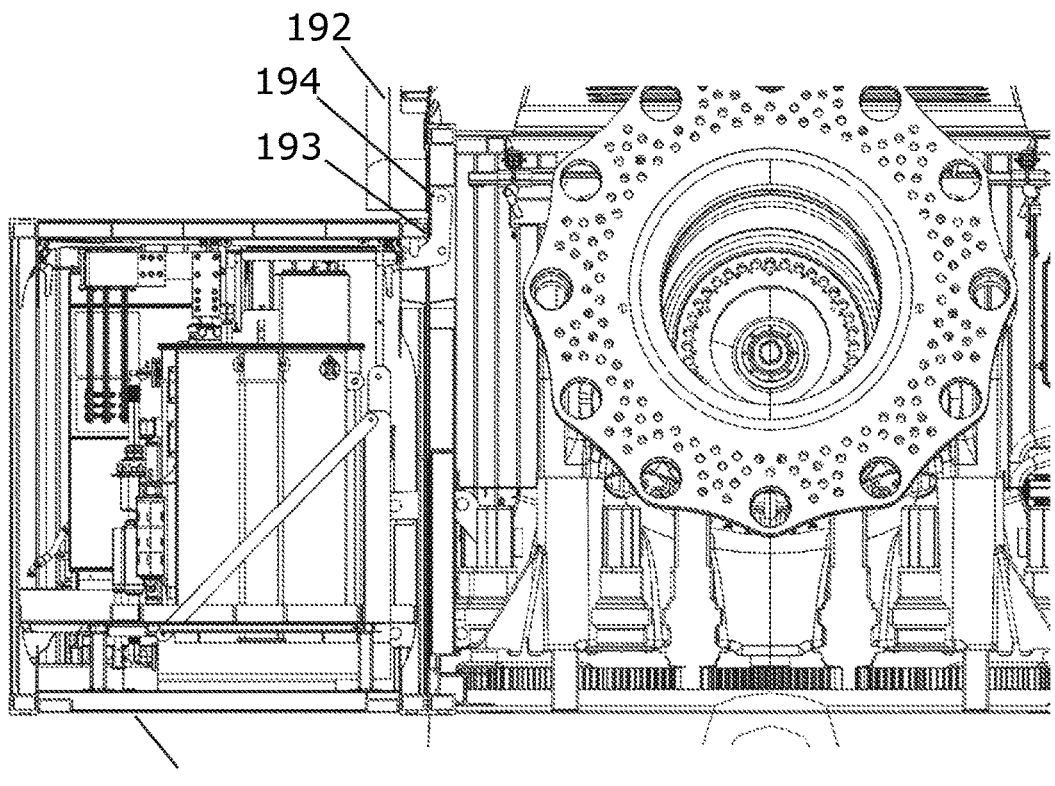
Figure 19B:
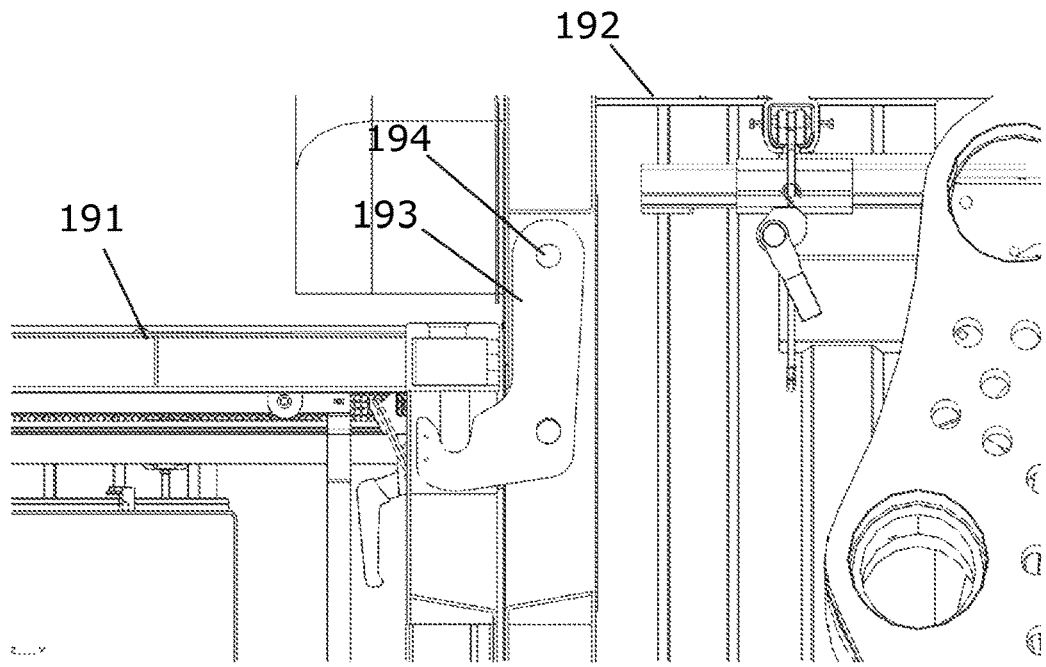
Figure 19C:
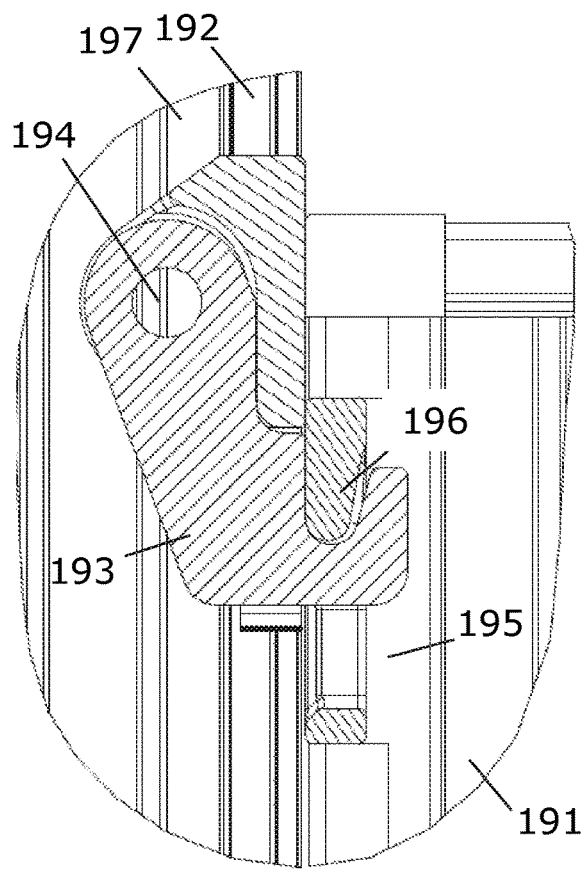

FIGS. 19a, 19b and 19c illustrates further details of the unit fixation structure in the form of a hook for attaching the auxiliary unit 191 to the main unit 192. The hook 193 is suspended rotationally at the hinge 194 in the main unit. The hook can rotate through the opening 195 in the auxiliary unit and catch a recess or edge 196 in the auxiliary unit.

The hook could also be attached in the auxiliary unit and catch a recess or edge in the main unit, in which case it may be attached reversely, i.e. as illustrated in FIG. 20. The position of the hook may be controlled by an actuator.

FIG. 21 illustrates the hook in an open position where the auxiliary unit is free to be lowered to the ground.

FIG. 22 illustrates a cross section where two bolt holes 221 can be seen. The bolt holes facilitate attachment of the auxiliary unit on the main unit by use of bolts for solid fixation. In this embodiment, the hook is mainly for positioning the auxiliary unit in the correct height relative to the main unit, and the bolts are for joining the units.

In FIGS. 19, 21 and 22, the hook is preferably supported by the main frame of the main unit, e.g. via column or support posts arranged along an inner surface of the main unit. In FIG. 19, the column 197 extends along an inner surface of the main unit and supports the hook on the main frame in the bottom part of the main unit.

In FIG. 20, where the hook forms part of the auxiliary unit, the edge in the main unit where the hook engages, may preferably be carried by the main frame in the main unit. Again, this could be via posts or columns arranged along an inner surface of the main unit.

The hook could be moved between the open position (FIG. 21) and the closed position (FIG. 19, 20, 22) by power driven means, e.g. including a hydraulically driven actuator.

FIGS. 23, 24, 25 illustrate an embodiment where the hook is not rotationally suspended but slidingly suspended. The function is like the embodiment of FIGS. 19-22. In FIGS. 23 and 24, a cross sectional view illustrates a bolt hole 231 which can be used for solid, bolted fixation of the auxiliary unit on the main unit. The hook in FIG. 23 is attached to the main unit and the hook in FIG. 24 is attached to the auxiliary unit.

In FIG. 25a, the hook 251 is slid to the left thereby disengaging the edge of the auxiliary unit and allowing the auxiliary unit to be lowered to the ground. In FIG. 25b, the hook 251 is slid to the right, thereby engaging the edge of the auxiliary unit and holding the two units fixed to each other. The hook may be slid by power driven means, e.g. by a hydraulic actuator.

In the description above, FIGS. 19-25 are explained as parts of the unit fixation structure for fixing the auxiliary unit to the main unit. Similar structures may constitute the first suspension structure by which the operative component is releasably fixed to the main unit.

Similar structures may also constitute the second suspension structure by which the operative component is releasably fixed to the auxiliary unit, and similar structures may constitute the third fixation structure by which two auxiliary units are fixed to each other.

FIG. 26 illustrates hoisting of an auxiliary unit up or down during maintenance or replacement. The auxiliary unit is hoisted by use of a crane 261 forming part of the main unit. Movement is essentially only in the vertical plane, illustrated by the arrow 263, and the attachment of the auxiliary unit on the main unit may be facilitated by a unit fixation structure as described previously, including movable fixation features such as hinged or slidable hooks etc.

FIG. 27 illustrates the internal crane 261 in an enlarged view. The crane is attached to a roof part of the main unit and by its location, it can hoist the auxiliary unit in a vertical direction to a position where said unit fixation structures can form engagement between the main and the auxiliary units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

FIG. 28 illustrates schematically, another crane structure with a double cantilever beam 281 on the roof of the main unit 282. The cantilever beam 281 can extend sideways in telescopic section 283. The cantilever beam facilitates lifting and connection of the auxiliary unit 284 to the main unit 282. Even though the unit fixation structures disclosed herein, including pivotable or slidable hooks, generally facilitate attachment of the auxiliary unit by hoisting only in the vertical direction, the in and out movement facilitates fine adjustment of a horizontal distance between the main unit and the auxiliary unit.

Definitions

Herein, the term "nacelle" means the generally accepted term describing the machine house for a wind turbine, i.e. that part which carries the rotor and drivetrain, and which is carried by the wind turbine tower.

The terms "main unit" and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

The invention claimed is:

1. A wind turbine nacelle configured for mounting on a wind turbine tower and housing a rotor-supporting assembly supporting a rotor, the nacelle further housing a power conversion assembly, the nacelle comprising:
   a main unit arranged to be connected to the wind turbine tower and housing the rotor-supporting assembly, and
   at least one auxiliary unit housing an operative component forming part of the power conversion assembly,
   wherein:
      the main unit and the auxiliary unit are separate units configured to be connected by a unit fixation structure at an interface,
      the operative component is suspended directly on the main unit, and
      the main unit and the at least one auxiliary unit are arranged side by side in a direction transverse to a rotational axis defined by the rotor-supporting assembly.

2. The nacelle according to claim 1, comprising a first suspension structure suspending the operative component directly on a main frame in the main unit, the main frame forming part of a load path from the rotor into the wind turbine tower.

3. The nacelle according to claim 1, comprising a second suspension structure for suspension of the operative component on the at least one auxiliary unit.

4. The nacelle according to claim 3, wherein the unit fixation structure is configured to fixate the at least one auxiliary unit to the main unit in an assembly position of the at least one auxiliary unit relative to the main unit, and wherein the first suspension structure is configured to take over suspension of the operative component from the second suspension structure upon movement of the at least one auxiliary unit to the assembly position.

5. The nacelle according to claim 2, wherein the first suspension structure comprises at least one bracket connected to the operative components and to the main frame.

6. The nacelle according to claim 5, wherein each bracket extends through a corresponding wall opening in an outer wall of at least one of the main unit and the auxiliary unit.

7. The nacelle according to claim 6, wherein each wall opening has a size exceeding a cross-sectional dimension of the corresponding bracket to define a gap between an edge about the wall opening and the bracket.

8. The nacelle according to claim 2, wherein the first suspension structure is configured for releasable suspension of the operative component to the main frame.

9. The nacelle according to claim 3, wherein the second suspension structure is configured for releasable suspension of the operative component on the at least one auxiliary unit.

10. The nacelle according to claim 1, wherein an interface between the main unit and the at least one auxiliary unit defines a gap allowing air to pass between a surface of the main unit and a facing surface of the at least one auxiliary unit.

11. The nacelle according to claim 10, wherein the first suspension structure extends across the gap.

12. The nacelle according to claim 1, wherein the operative component is an electrolysis cell stack, a transformer, or a converter.

13. The nacelle according to claim 1, wherein the rotor drives a generator located outside the nacelle.

14. The nacelle according to claim 1, wherein the nacelle further houses a generator driven by the rotor.

15. A method of assembling a wind turbine with the nacelle according to claim 1, comprising:
   receiving to a site of erection of the wind turbine, the main unit and the at least one auxiliary unit, the main unit including a main frame configured to form part of a load path from the rotor into the wind turbine tower, the at least one auxiliary unit including the operative component, attaching the at least one auxiliary unit to the main unit, and directly attaching the operative component in the at least one auxiliary unit to the main frame in the main unit.

16. The method according to claim 15, further comprising:

supporting the operative component from the main frame via a first suspension structure, and supporting the operative component from the auxiliary unit via a second suspension structure.

17. The method according to claim 15, comprising transferring load from the second suspension structure to the first suspension structure while moving the auxiliary unit towards an assembly position wherein a unit fixation structure connects the auxiliary unit to the main unit.

18. The method according to claim 15, wherein the main unit is attached to the wind turbine tower, and the method further comprises:

hoisting the at least one auxiliary unit to the main unit by use of a crane structure attached to the main unit, or lowering the at least one auxiliary unit from the main unit by use of the crane structure attached to the main unit.

19. The method according to claim 18, wherein hoisting the at least one auxiliary unit includes hoisting the at least one auxiliary unit only in a vertical plane by use of the crane structure.

20. A method of servicing a wind turbine with the nacelle according to claim 1, comprising:

detaching the operative unit from the main unit while the operative unit is contained in the at least one auxiliary unit, and lowering the at least one auxiliary unit to a ground for service of replacement at the ground.

21. A wind turbine nacelle configured for mounting on a wind turbine tower and housing a rotor-supporting assembly supporting a rotor, the nacelle further housing a power conversion assembly, the nacelle comprising:

a main unit configured to be connected to the wind turbine tower, wherein the main unit comprises at least one wall that defines an interior, and wherein the main unit includes a main frame and the rotor-supporting assembly in its interior, and wherein the main frame is configured to form part of a load path from the rotor into the wind turbine tower, and at least one auxiliary unit separate from the main unit and configured to be connected to the main unit by a unit fixation structure at an interface, wherein the at least one auxiliary unit comprises at least one wall that defines an interior, and wherein the at least one auxiliary unit includes an operative component forming part of the power conversion assembly in its interior, and a first suspension structure configured to extend from the interior of the main unit to the interior of the at least one auxiliary unit for suspending the operative component directly on a main frame in the main unit.

\* \* \* \* \*